United States Patent
Iyasu et al.

(10) Patent No.: US 10,637,370 B2
(45) Date of Patent: Apr. 28, 2020

(54) APPARATUS FOR CONTROLLING DC-AC CONVERTER TO REDUCE DISTORTIONS IN OUTPUT CURRENT

(71) Applicant: DENSO CORPORATION, Kariya, Aichi-pref. (JP)

(72) Inventors: Seiji Iyasu, Nisshin (JP); Yuji Hayashi, Nisshin (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/253,699

(22) Filed: Jan. 22, 2019

(65) Prior Publication Data

US 2019/0229645 A1  Jul. 25, 2019

(30) Foreign Application Priority Data

Jan. 25, 2018 (JP) .................................. 2018-011001

(51) Int. Cl.
| | | |
|---|---|---|
| *H02M 7/5387* | (2007.01) | |
| *H02M 1/42* | (2007.01) | |
| *H02M 1/12* | (2006.01) | |
| *H02M 1/00* | (2006.01) | |

(52) U.S. Cl.
CPC .......... *H02M 7/5387* (2013.01); *H02M 1/12* (2013.01); *H02M 1/4208* (2013.01); *H02M 1/4225* (2013.01); *H02M 2001/0025* (2013.01)

(58) Field of Classification Search
CPC . H02M 2001/0025; H02M 2001/0058; H02M 1/12; H02M 1/42; H02M 1/4208; H02M 7/44; H02M 7/48; H02M 7/537; H02M 7/539; H02M 7/5395; H02M 7/5387; H02M 1/4225
See application file for complete search history.

(56) References Cited

U.S. PATENT DOCUMENTS

| | | | | |
|---|---|---|---|---|
| 6,545,887 B2* | 4/2003 | Smedley | ................... | H02J 3/01 363/44 |
| 9,590,484 B2* | 3/2017 | Chen | ....................... | H02M 1/12 |
| 2013/0301323 A1* | 11/2013 | Iyasu | ..................... | H02M 7/797 363/123 |

(Continued)

FOREIGN PATENT DOCUMENTS

| | | |
|---|---|---|
| JP | 2015-198460 A | 11/2015 |
| JP | 2016-192889 A | 11/2016 |

*Primary Examiner* — Gustavo A Rosario-Benitez
(74) *Attorney, Agent, or Firm* — Oliff PLC

(57) ABSTRACT

In an apparatus for controlling a DC-AC converter including a reactor and a plurality of drive switches and configured to convert DC power supplied via input terminals into AC power and supply the AC power to an AC power source connected to output terminals. In the apparatus, a current corrector is configured to set a current correction value including a harmonic component for a frequency component of a supply voltage of the AC power source that has minima at zero crossings where the supply voltage is zero and superimpose the current correction value on a sinusoidal commanded current generated based on the supply voltage of the AC power source, thereby generating a commanded current after correction. A current controller is configured to operate the drive switches using peak current mode control to control the reactor current to the commanded current after correction.

8 Claims, 17 Drawing Sheets

(56) References Cited

U.S. PATENT DOCUMENTS

| | | | | |
|---|---|---|---|---|
| 2014/0029308 A1* | 1/2014 | Cojocaru | ................ | H01G 4/38 |
| | | | | 363/13 |
| 2014/0198538 A1* | 7/2014 | Kimura | ............ | H02M 3/33507 |
| | | | | 363/21.09 |
| 2014/0361720 A1* | 12/2014 | Miyachi | ................... | H02P 6/16 |
| | | | | 318/400.39 |
| 2015/0280591 A1* | 10/2015 | Handa | ................. | H02M 1/4225 |
| | | | | 363/21.04 |
| 2016/0094134 A1* | 3/2016 | Iyasu | ............... | H02M 3/33515 |
| | | | | 363/17 |
| 2017/0302161 A1* | 10/2017 | Green | ................ | H02M 1/4208 |
| 2018/0269779 A1* | 9/2018 | Wang | ................. | H02M 1/4225 |

* cited by examiner

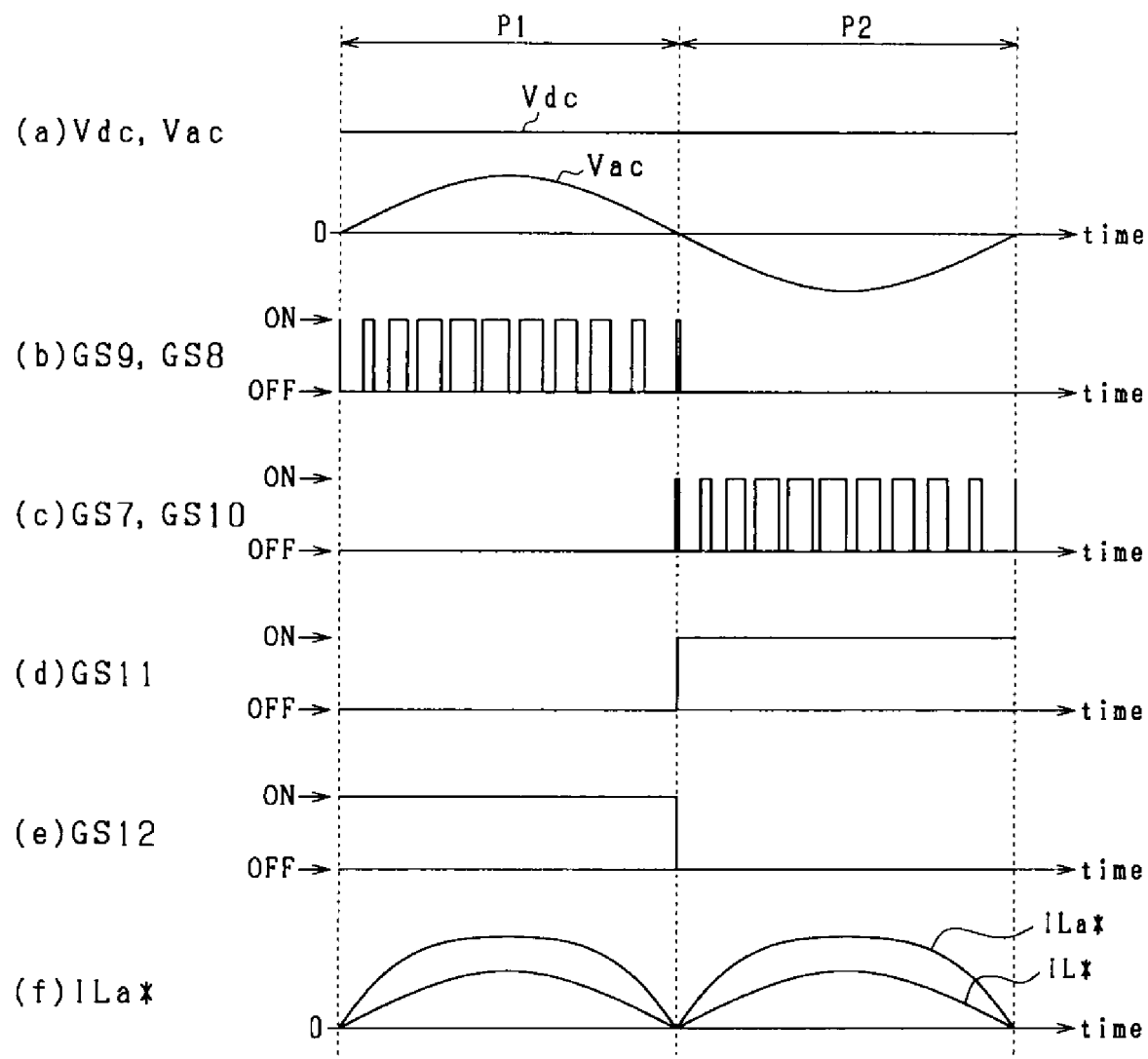

APPARATUS FOR CONTROLLING DC-AC CONVERTER TO REDUCE DISTORTIONS IN OUTPUT CURRENT

CROSS-REFERENCE TO RELATED APPLICATION

This application is based on and claims the benefit of priority from earlier Japanese Patent Application No. 2018-11001 filed on Jan. 25, 2018, the description of which is incorporated herein by reference.

BACKGROUND

Technical Field

The present disclosure relates to an apparatus for controlling a DC-AC converter that converts direct-current (DC) power into alternating-current (AC) power.

Related Art

An apparatus for controlling an AC-DC converter operative to convert alternating-current (AC) power supplied from an AC power source into direct-current (DC) power is known that is configured to operate drive switches with well-known peak current mode control to thereby control a reactor current through a reactor to a command value. An apparatus for controlling the AC-DC converter, disclosed in JP-A-2015-198460, is configured to superimpose current correction values on the command values for the reactor currents to reduce distortions in input currents near zero crossings where a voltage supplied from the AC power source is zero. As described in JP-A-2015-198460, the current correction values are set such that the command values near zero crossings are more increased than during other periods.

A DC-AC converter is operative to convert DC power supplied via an input terminal into AC power and supply the alternating-current (AC) power after conversion to the AC power source. Also in such a converter, reducing distortions in output currents can improve a power factor of AC power to be supplied to the AC power source. However, the DC-AC converter is different in circuit topology from the AC-DC converter. Thus, the technique for reducing distortions in input currents of the AC-DC converter as disclosed in JP-A-2015-198460 is not directly applicable to the DC-AC converter.

In view of the above, it is desired to have an apparatus for controlling a DC-AC converter operative to convert DC power into AC power, able to reduce distortions in output currents of the DC-AC converter.

SUMMARY

One aspect of the disclosure provides an apparatus for controlling a DC-AC converter including a reactor and a plurality of drive switches and configured to convert DC power supplied via input terminals into AC power and supply the AC power to an AC power source connected to output terminals. The DC-AC converter is provided with a current detector configured to detect a reactor current through the reactor. In the apparatus, a current corrector is configured to set a current correction value including a harmonic component for a frequency component of a supply voltage of the AC power source that has minima at zero crossings where the supply voltage is zero and superimpose the current correction value on a sinusoidal commanded current generated based on the supply voltage of the AC power source, thereby generating a commanded current after correction. A current controller is configured to operate the drive switches using peak current mode control to control the reactor current to the commanded current after correction.

Using peak current mode control, the on-period of the drive switches is set to control the reactor current to the commanded current. When the commanded current is set to have a sinusoidal wave such that the output current of the DC-AC converter takes a value responsive to a phase of the supply voltage of the AC power source, a discrepancy between the commanded reactor current and the average of reactor current at zero crossings where the supply voltage of the AC power source is zero are smaller than during the other periods. Thus, in the event where the current correction value fails to be set to a value responsive to the discrepancy, the commanded current after correction in the peak current mode control may cause the on-period of the drive switches to increase above or decrease below its proper value, which may lead to increased current distortions near zero crossings.

In the aspect of the present disclosure, the current controller is configured to set the current correction value including the harmonic component for the frequency component of the supply voltage that has minima at zero crossings. The current controller is further configured to correct the sinusoidal commanded reactor current by adding the current correction value thereto. With this configuration, the commanded current after correction near the zero crossings takes a value responsive to the discrepancy, thereby reducing only distortions in the output current, which can prevent a reduction in power factor for output power of the DC-AC converter.

BRIEF DESCRIPTION OF THE DRAWINGS

FIG. 21 is a timing diagram for a DC-AC converter according to the fifth embodiment.

DESCRIPTION OF SPECIFIC EMBODIMENTS

With reference to the accompanying drawings, hereinafter are described several embodiments of the present disclosure. In these embodiments, "connected" may be used to indicate that two or more elements are in direct physical or electrical contact with each other.

First Embodiment

A power converter including a DC-AC converter in accordance with the present embodiment will now be described. The power converter is electrically connected to an AC power source and converts direct-current (DC) power supplied via input terminals into alternating-current (AC) power to supply the AC power to the AC power source.

Figure 1:
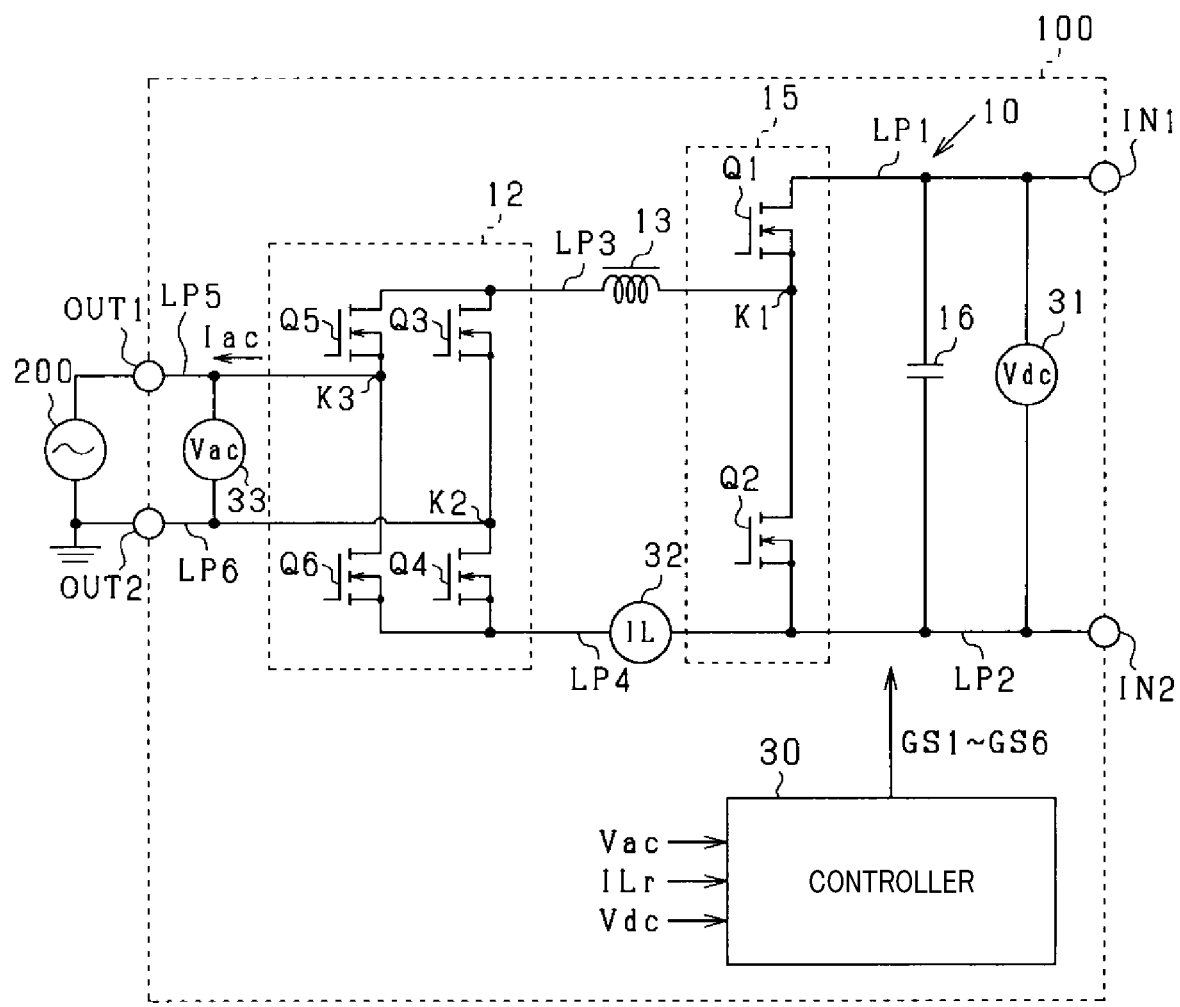
FIG. 1 is a circuit diagram of a power converter in accordance with a first embodiment of the present disclosure.

FIG. 1 illustrates a circuit diagram of the power converter 100 in accordance with the present embodiment. The power converter 100 includes a DC-AC converter 10 and a controller 30. A DC power source (not shown) is connected between a first input terminal IN1 and a second input terminal IN2 of the DC-AC converter 10. An AC power source 200 is connected between a first output terminal OUT1 and a second output terminal OUT2 of the DC-AC converter 10. The AC power source 200 may be a commercially available power source. The DC power source may be a battery.

The DC-AC converter 10 includes a capacitor 16, a half-bridge circuit 15, a reactor 13, a full-bridge circuit 12, and first to sixth wirings LP1-LP6.

A wiring of the DC-AC converter 10 connected to the first input terminal IN1 is referred to as a first wiring LP1. Another wiring of the DC-AC converter 10 connected to a second input terminal IN2 is referred to as a second wiring LP2. A high voltage side wiring included in the DC-AC converter 10 connecting the half-bridge circuit 15 and the full-bridge circuit 12 is referred to as a third wiring LP3. A low voltage side wiring included in the DC-AC converter 10 connecting the half-bridge circuit 15 and the full-bridge circuit 12 is referred to as a fourth wiring LP4. A wiring of the DC-AC converter 10 connected to the first output terminal OUT1 is referred to as a fifth wiring LP5. A wiring of the DC-AC converter 10 connected to the second output terminal OUT2 is referred to as a sixth wiring LP6.

A first end of the capacitor 16 is connected to the first wiring LP1 and a second end of the capacitor 16 is connected to the second wiring LP2.

The half-bridge circuit 15 includes a first switch Q1 and a second switch Q2. The first and second switches Q1, Q2 are voltage-driven switches, which are N-channel MOSFETs in the present embodiment. A source of the first switch Q1 and a drain of the second switch Q2 are connected to each other. A drain of the first switch Q1 is connected to the first wiring LP1. A source of the second switch Q2 is connected to the second wiring LP2. Each of the first and second switches Q1, Q2 has a parasitic diode connected in anti-parallel therewith. In the present embodiment, the first switch Q1 corresponds to a drive switch.

A first connection point K1 between the first and second switches Q1, Q2 is connected to a first end of the third wiring LP3. The reactor 13 is provided along the third wiring LP3. The source of the second switch Q2 of the half-bridge circuit 15 is connected to a first end of the fourth wiring LP4. Second ends of the third and fourth wirings LP3, LP4 are connected to the full-bridge circuit 12.

The full-bridge circuit 12 includes third to sixth switches Q3-Q6. The third to sixth switches Q3 to Q6 are voltage-driven switches, which are N-channel MOSFETs in the present embodiment. A source of the third switch Q3 and a drain of the fourth switch Q4 are connected to each other. A source of the fifth switch Q5 and a drain of the sixth switch Q6 are connected to each other. Drains of the third and fifth switches Q3, Q5 are connected to the third wirings LP3. Sources of the fourth and sixth switches Q4, Q6 are connected to the fourth wiring LP4.

A second connection point K2 between the third switch Q3 and the fourth switch Q4 is connected to a first end of the sixth wiring LP6. A second end of the sixth wiring LP6 is connected to the second output terminal OUT2. A third connection point K3 between the fifth switch Q5 and the sixth switch Q6 is connected to a first end of the fifth wiring LP5. A second end of the fifth wiring LP5 is connected to the first output terminal OUT1.

The power converter 100 includes a first voltage sensor 31, a current sensor 32, and a second voltage sensor 33. In the present embodiment, the first voltage sensor 31 corresponds to a voltage detector.

The first voltage sensor 31 is connected between the first and second wirings LP1, LP2 on the opposite side of the capacitor 16 from the half-bridge circuit 15 to detect a DC voltage input via the first and second input terminals IN1, IN2 as an input voltage Vdc.

The current sensor 32 is provided along the fourth wiring LP4 to detect a reactor current ILr through the reactor 13.

The second voltage sensor 33, between the first and second output terminals OUT1, OUT2 and the full-bridge circuit 12, is connected between the fifth and sixth wirings LP5, LP6 to detect a voltage of the AC power source 200 as a supply voltage Vac.

The controller 30 is configured to control the open/closed state of each of the first to sixth switches Q1-Q6 of the DC-AC converter 10. Various functions of the controller 10 may be implemented by software stored in a tangible memory device and a computer that executes it, hardware, or a combination thereof.

Figure 2:
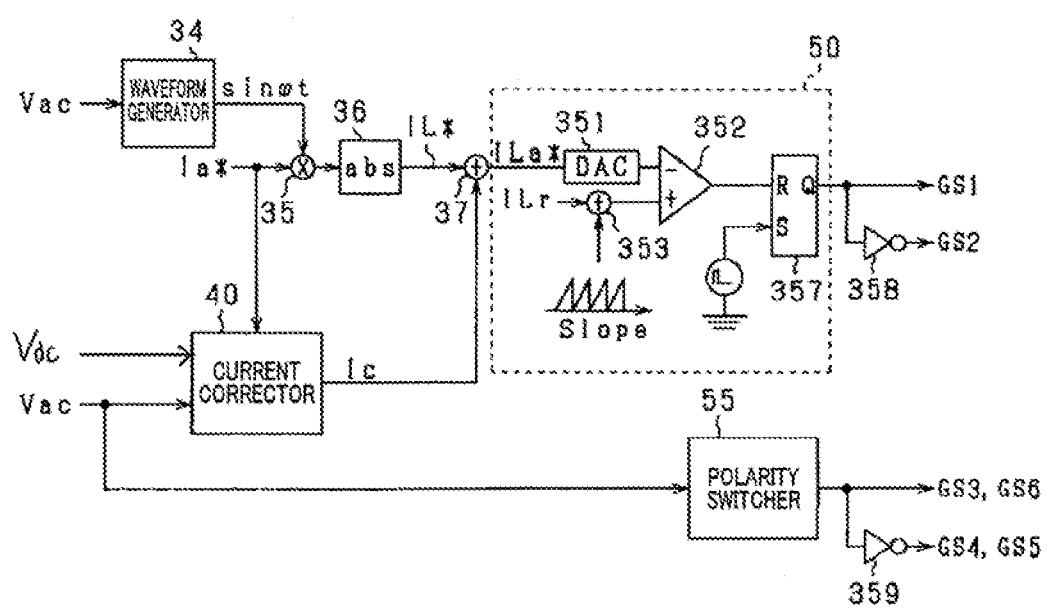
FIG. 2 is a functional block diagram of a controller.

FIG. 2 is a functional block diagram of the controller 30. The controller 30 is configured to, with well-known peak current mode control, control each of the first and second switches Q1, Q2 from an open/closed state to a closed/open state. The controller 30 includes a waveform generator 34, a multiplier 35, an absolute value calculator 36, an adder 37, a current corrector 40, a current controller 50, and a polarity switcher 55.

The waveform generator 34 is configured to generate a reference waveform $|\sin 107\ t|$ indicating changes in the voltage over a half period of the AC power source 200. For example, the waveform generator 34 detects zero crossings where the supply voltage Vac detected by the second voltage sensor 33 is zero and set a period in time where the supply voltage Vac changes from one zero crossing to the next zero crossing as a half period ($=T/2$) of the AC power source 200.

The waveform generator 34 calculates an angular speed ω (=2π×(1/T)) of the AC power source 200 from the time period T. The waveform generator 34 sets an angular speed of a sinusoidal wave signal with an amplitude of 1 to the calculated angular speed, thereby calculating the reference waveform |sin ωt| in phase with the supply voltage Vac.

The multiplier 35 is configure to multiply an amplitude command value Ia* of the reactor current ILr and the reference waveform |sin ωt| generated by the waveform generator 34. The amplitude command value Ia* is a commanded value for the amplitude of the reactor current ILr, which may be determined based on a voltage command value. The absolute value calculator 36 is configured to set an absolute value of an output value from the multiplier 35 as a commanded current before correction IL*. In the present embodiment, the commanded current before correction IL* corresponds to the commanded reactor current.

The current corrector 40 is configured to set a current correction value Ic for correcting the commanded current before correction IL*. The current correction value Ic is a correction value for reducing distortions in the output current Iac. In the present embodiment, the current corrector 40 is configured to set a current correction value Ic based on the supply voltage Vac and the commanded current before correction IL*. The adder 37 is configured to add the current correction value Ic to an absolute value of the commanded current before correction IL* to set the resultant value as a commanded current after correction ILa*.

The current controller 50 is configured to, based on the reactor current ILr detected by the current sensor 32 and the commanded current after correction ILa*, generate a first gate signal GS1 for operating the first switch Q1 and a second gate signal GS2 for operating the second switch Q2. In the present embodiment, the current controller 50 generates the first and second gate signals GS1, GS2 using well-known peak current mode control.

The current controller 50 includes a digital-to-analog (DA) converter 351, a comparator 352, an adder 353, and an RS flip-flop 357. The commanded current after correction ILa* is input to the DA converter 351. The DA converter 351 is configured to digital-to-analog convert the received commanded current after correction ILa*. The resultant analog commanded current after correction ILa* is input to an inverting input terminal of the comparator 352. The adder 353 is configured to add the reactor current ILr and the slope compensation signal Slope to output a reactor current after compensation ILcr that is a sum of the reactor current ILr and the slope compensation signal Slope. The output of the adder 353 is input to a non-inverting input terminal of the comparator 352. The slope compensation signal Slope suppresses oscillation caused by variations in current through the reactor 13.

The comparator 352 is configured to compare the commanded current after correction ILa* and the reactor current after compensation ILcr and input a signal in the LOW state to an R terminal of the RS flip-flop 357 during a period in time where the reactor current after compensation ILcr is lower than the commanded current after correction ILa*. The comparator 352 is further configured to input a signal in the HIGH state to the R terminal of the RS flip-flop 357 during a period in time where the reactor current after compensation ILcr is higher than the commanded current after correction ILa*. A clock signal is input to the S terminal of the RS flip-flop 357.

The Q terminal of the RS flip-flop 357 is connected to the gate of the first switch Q1. The first gate signal GS1 is output from the Q terminal to the gate of the first switch Q1. The output terminal of the RS flip-flop 357 is connected through an inverter 358 to the gate of the second switch Q2. The second gate signal GS2 is output from the Q terminal through the inverter 358 to the gate of the second switch Q2. The second gate signal GS2 is the inverse of the value of the first gate signal GS1.

The polarity switcher 55 is configured to invert the output signal in response to the polarity of the supply voltage Vac. The polarity switcher 55 is configured to, if determining that the polarity of the supply voltage Vac is positive, place the output signal from the output terminal in a HIGH state. The polarity switcher 55 is configured to, if determining that the polarity of the supply voltage Vac is negative, place the output signal from the output terminal in a LOW state.

The output terminal of the polarity switcher 55 is connected to the gate of each of the third and sixth switches Q3, Q6. A signal output from the output terminal of the polarity switcher 55 to the gate of third switch Q3 is a third gate signal GS3. A signal output from the output terminal of the polarity switcher 55 to the gate of sixth switch Q6 is a sixth gate signal GS6. The output terminal of the polarity switcher 55 is connected to the gate of each of the fourth and fifth switches Q4, Q5 through the inverter 359. A signal output from the output terminal of the polarity switcher 55 through the inverter 359 to the gate of fourth switch Q4 is a fourth gate signal GS4. A signal output from the output terminal of the polarity switcher 55 through the inverter 359 to the gate of fifth switch Q5 is a fifth gate signal GS5. Each of the fourth and fifth gate signals GS4, GS5 is the inverse of a respective one of the third and sixth gate signals GS3, GS6.

Figure 3:
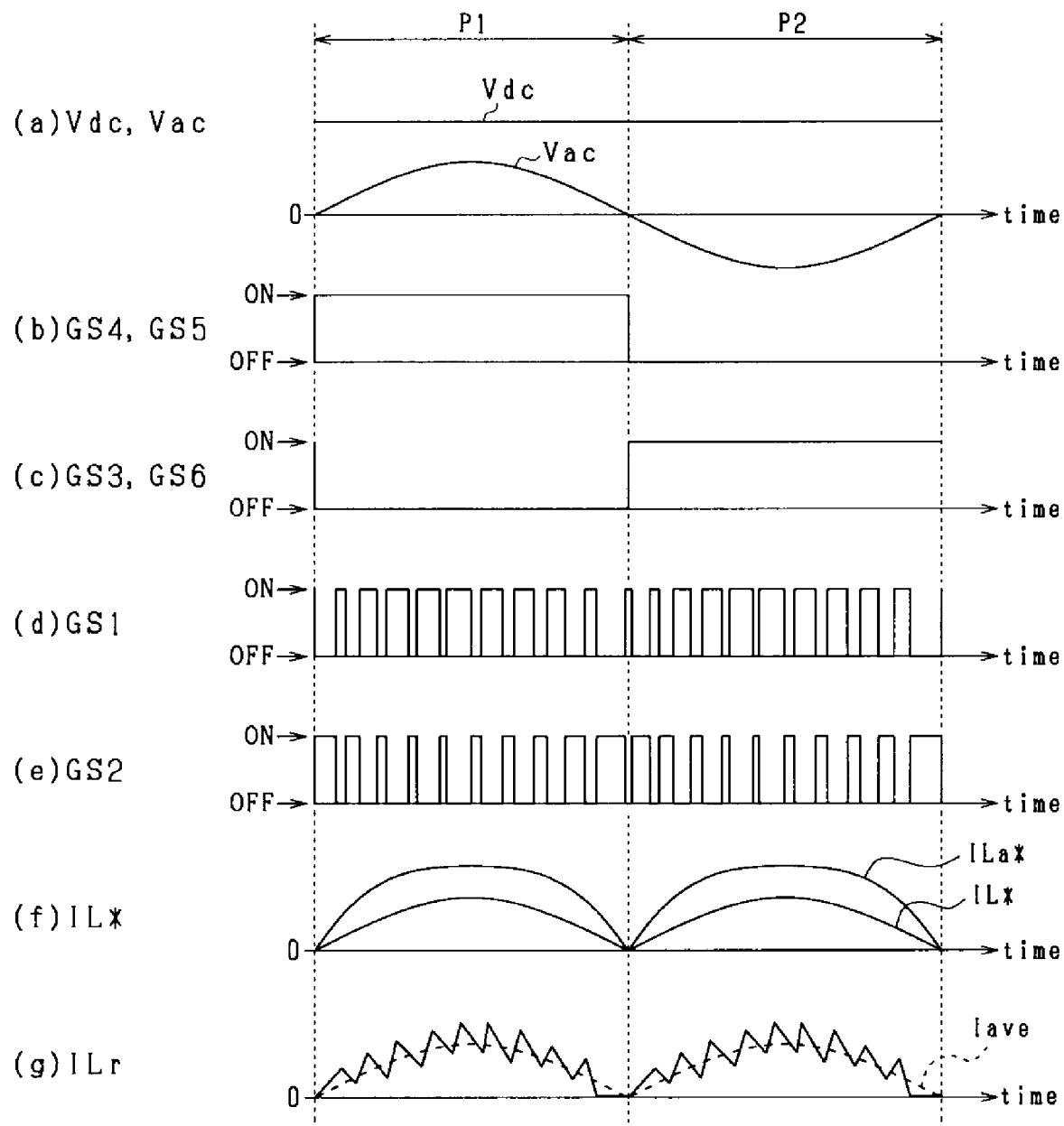
FIG. 3 is a timing diagram for a DC-AC converter.

Example operations of the DC-AC converter 10 will now be described. FIG. 3 is a timing diagram for the DC-AC converter 10 of the present embodiment. FIG. 3(a) illustrates an example of a change in each of the input voltage Vdc and the supply voltage Vac. FIG. 3(b) illustrates an example of a change in each of the fourth and fifth gate signals GS4, GS5. FIG. 3(c) illustrates an example of a change in each of the third and sixth gate signals GS3, GS6. FIG. 3(d) illustrates an example of a change in the first gate signal GS1. FIG. 3(e) illustrates an example of a change in the second gate signal. FIG. 3(f) illustrates an example of a change in the commanded current after correction ILa*. FIG. 3(g) illustrates an example of a change in the reactor current ILr.

During a first period P1 where the supply voltage Vac is positive, the fourth and fifth gate signals GS4, GS5 in the HIGH state place the fourth and fifth switches Q4, Q5 in the closed state, respectively. The third and sixth gate signals GS3, GS6 in the LOW state place the third and sixth switches Q3, Q6 in the open state, respectively. During the first period P1, placing the first gate signal GS1 in the HIGH state and the second gate signal GS2 in the LOW state forms a closed circuit including the reactor 13, the first switch Q1, the fourth switch Q4, and the fifth switch Q5, resulting in the output current Iac flowing from the first output terminal OUT1 to the second output terminal OUT2. Then, a reactor current ILr flows through the reactor 13, which is responsive to a difference between a voltage applied from the half-bridge circuit 15 to the reactor 13 and the supply voltage Vac. The voltage applied from the half-bridge circuit 15 to the reactor 13 is given by duty cycle (=Ton/Tsw) multiplied by the input voltage Vdc, where the duty cycle is on-period Ton of the first switch Q1 divided by one switching period Tsw.

During a second period P2 where the supply voltage Vac is negative, the fourth and fifth gate signals GS4, GS5 in the LOW state place the fourth and fifth switches Q4, Q5 in the open state, respectively. The third and sixth gate signals GS3, GS6 in the HIGH state place the third and sixth switches Q3, Q6 in the closed state, respectively. During the second period P2, placing the first switch Q1 in the closed state and the second switch Q2 in the open state forms a closed circuit including reactor 13, the first switch Q1, the third switch Q3, and the sixth switch Q6, resulting in the output current Iac flowing from the second output terminal OUT2 to the first output terminal OUT1.

The controller 30 sets the commanded current before correction IL* to a reference waveform (=|sin ωt|) of the supply voltage Vac multiplied by the amplitude command value Ia*. As shown in FIG. 3(f), the commanded current before correction IL* has a waveform such that the positive half of sinusoidal wave is repeated at the half period T/2. The commanded current before correction IL* sinusoidally decreases as the supply voltage Vac transitions from a peak to a zero crossing. As shown in FIG. 3(g), the average Iave of the reactor current ILr, like the commanded current before correction IL*, varies sinusoidally such that the average Iave has minima at zero crossings. Therefore, a discrepancy indicating a difference between the commanded current before correction IL* and the average Iave of the reactor current has minima near zero crossings.

In the event where the current correction value Ic fails to be set to a value responsive to the discrepancy, the commanded current after correction ILa* in the peak current mode control may cause the on-period of the first switch Q1 to increase above or decrease below its proper value, which may lead to increased current distortions near zero crossings. In the present embodiment, the controller 30 is configured to set the current correction value Ic set by the current corrector 40 to have minima at zero crossings of the supply voltage Vac.

Figure 4:
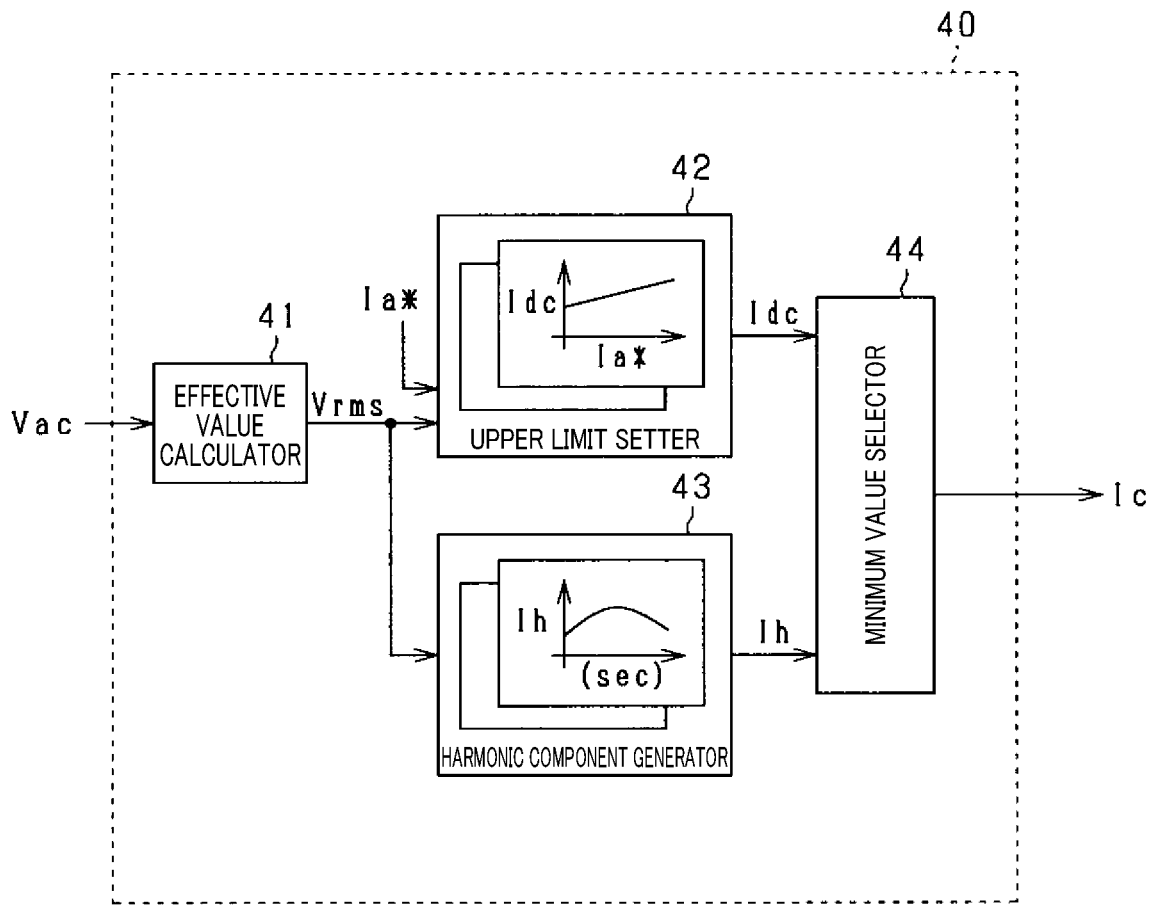
FIG. 4 is a functional block diagram of a current corrector.

FIG. 4 is a functional block diagram of the current corrector 40 of the present embodiment. The current corrector 40 includes an effective value calculator 41, an upper limit setter 42, a harmonic component generator 43, and a minimum value selector 44.

The effective value calculator 41 is configured to calculate an effective value Vrms of the AC power source 200 based on the supply voltage Vac.

The upper limit setter 42 is configured to set an upper limit Idc based on the effective value Vrms and the amplitude command value Ia*. An increase in the reactor current ILr increases with increasing amplitude command value Ia*. Therefore, the upper limit setter 42 sets the upper limit Idc to an increased value with increasing amplitude command value Ia*. In addition, the duty cycle D for the sixth switch Q6 increases with increasing effective value Vrms, thus leading to an increased discrepancy described later. Therefore, the upper limit setter 42 sets the upper limit Idc to an increased value with increasing effective value Vrms.

In the present embodiment, the upper limit setter 42 stores a direct-current component map representing a relationship between the amplitude command value Ia* and the upper limit Idc for each effective value Vrms. For example, each effective value Vrms corresponds to an effective value Vrms for a commercial power supply in each country. Therefore, the upper limit setter 42 can set the upper limit Idc responsive to the amplitude command value Ia* with reference to the direct-current component map for each effective value Vrms.

The harmonic component generator 43 is configured to set a harmonic component Ih based on the effective value Vrms. In the present embodiment, the harmonic component Ih set by the harmonic component generator 43 has minima at or near zero crossings of the supply voltage Vac and maxima at peaks of the supply voltage Vac. That is, the harmonic component Ih varies with time. In the present embodiment, it is assumed that the harmonic component Ih is zero at zero crossings. In an alternative embodiment, the harmonic component Ih may be greater than zero at zero crossings.

The harmonic component generator 43 stores a harmonic component map recording the harmonic component Ih for each effective value Vrms. Each harmonic map is defined such that the harmonic component Ih is set to an increased value with increasing effective value Vrms of the AC power source 200.

The minimum value selector 44 is configured to set a current correction value Ic to a smaller one of the upper limit Idc set by the upper limit setter 42 and the harmonic component Ih set by the harmonic component generator 43. If the harmonic component Ih is less than the upper limit Idc, the current correction value Ic is set to the harmonic component Ih. If the harmonic component Ih is equal to or greater than the upper limit Idc, the current correction value Ic is set to the upper limit Idc.

The current correction value Ic set by the current corrector 40 will now be described.

Figure 5:
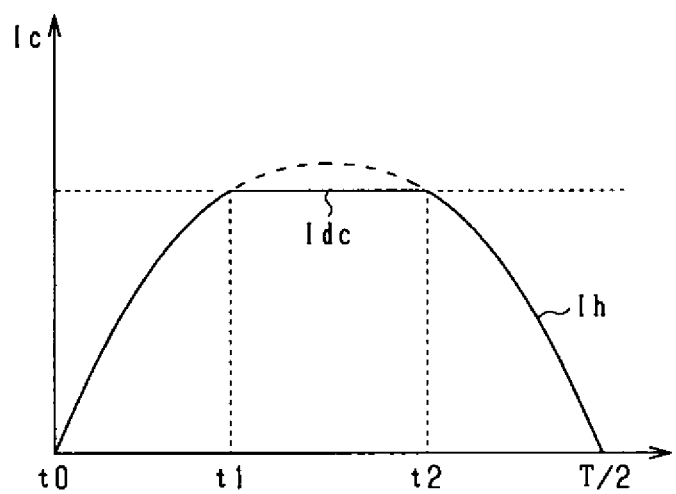
FIG. 5 is an example of a current correction value.

In the present embodiment, FIG. 5 illustrates the current correction value Ic in a case where the harmonic component Ih is less than the upper limit Idc during each of a time period between t0 and t1 and a time period between t2 and T/2 (t0<t1<T/2). The current correction value Ic is set to the harmonic component Ih during each of the time period between t0 and t1 and the time period between t2 and T/2. Therefore, the current correction value Ic has minima at zero crossings (t=t0, T/2). In addition, the current correction value Ic is set to the upper limit Idc during a time period between t1 and t2.

Figure 6:
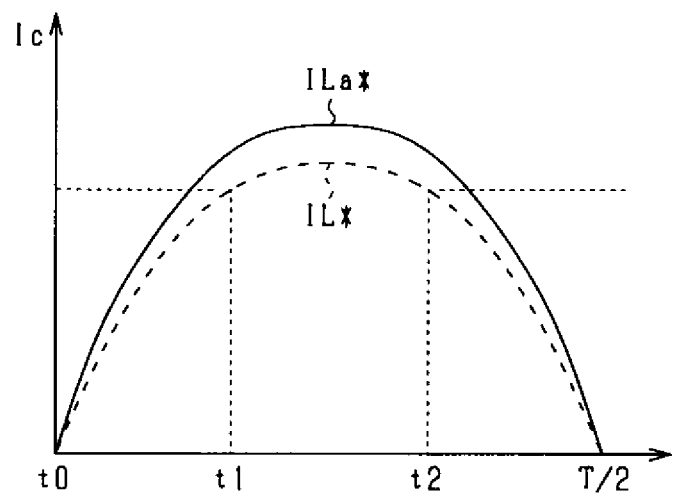
FIG. 6 is an example of a change in a commanded current after correction ILa*.

FIG. 6 illustrates an example of a change in the commanded current after correction ILa* acquired by correcting the commanded current before correction IL* using the current correction value Ic shown in FIG. 5. In FIG. 6, the commanded current before correction IL* is indicated by a broken line. The commanded current after correction ILa* shown in FIG. 6 is equal to the commanded current before correction IL* plus the harmonic component Ih during each of the time periods between t0 and t1 and between t2 and T/2. The commanded current after correction ILa* shown in FIG. 6 is equal to the upper limit Idc during the time period between t1 and t2.

A method of producing the harmonic component map will now be described with reference with FIG. 7.

Figure 7:
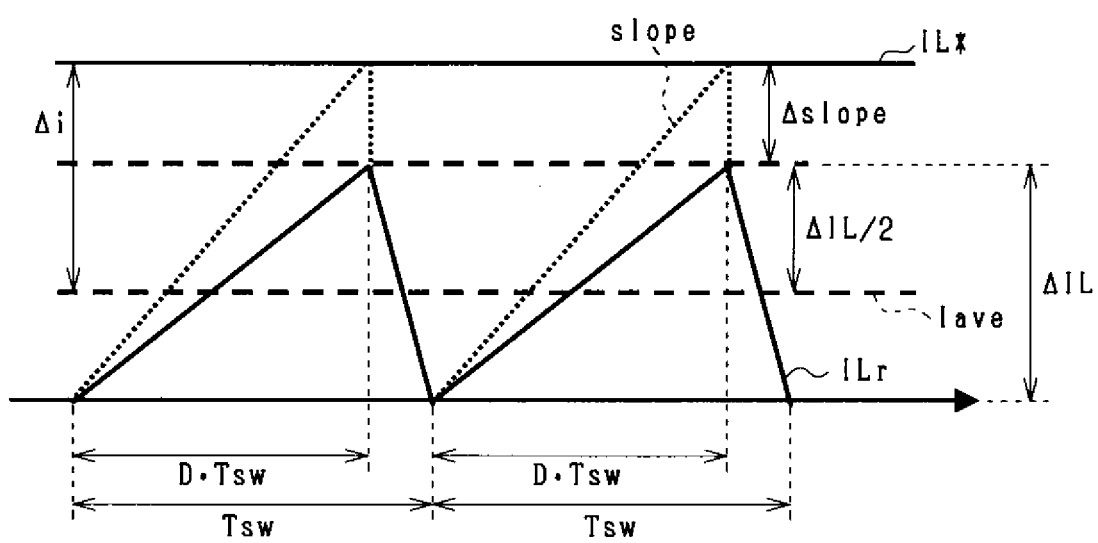
FIG. 7 is an illustration of a discrepancy.

FIG. 7 is an illustration of the discrepancy Δi. In the present embodiment, the discrepancy Δi is the commanded current before correction IL* minus the average Iave of the reactor current ILr.

Referring to FIG. 7, the discrepancy Δi is a maximum increase Δslope in the slope compensation signal Slope during the on-period (=D×Tsw) plus one-half of a maximum increase ΔIL in the reactor current ILr (=ΔIL/2). The discrepancy Δi is therefore calculated according to the following expression (1).

$$\Delta i = IL^* - Iave = \Delta slope + \Delta IL/2 \quad (1)$$

The maximum increase ΔIL in the reactor current ILr is calculated using a voltage across the reactor 13 and the inductance L of the reactor 13 according to the following expression (2).

$$\Delta IL = (Vdc - |Vac|)/L \times D \times Tsw \quad (2)$$

where D represents a duty cycle of the first switch Q1 during the on-period.

The maximum increase Δslope in the slope compensation signal Slope can be calculated according to the following expression (3).

$$\Delta slope = m \times D \times Tsw \quad (3)$$

where m (A/s) represents an increase rate of the slope compensation signal Slope.

The duty cycle D can be calculated using the maximum of the supply voltage Vac according to the following expression (4).

$$D = \frac{(\sqrt{2}\, V_{rms} \cdot |\sin\omega t|)}{(V_{dc})} \quad (4)$$

Based on the expressions (1) through (4), the discrepancy Δi is calculated using the following expression (5).

$$\Delta i = m \cdot \frac{\sqrt{2}\, V_{rms} \cdot |\sin\omega t|}{V_{dc}} \cdot T_{sw} + \frac{\sqrt{2}\, V_{rms} \cdot |\sin\omega t| \cdot (V_{dc} - \sqrt{2}\, V_{ac} \cdot \lceil \sin\omega t \rceil)}{2L \cdot V_{dc}} \cdot T_{sw} \quad (5)$$

Assuming that parameters m, Vdc, ω, Tsw, L are constants, the expression (5) indicates that the discrepancy Δi is a higher order function of time t within one switching period Tsw and an effective value Vrms. According to the expression (5), the discrepancy Δi has minima at zero crossings (sin ωt=0) and maxima at peaks (sin ωt=1).

In the present embodiment, using the discrepancy Δi given by the expression (5), a harmonic component Ih during one switching period Tsw is calculated. For example, the discrepancy Δi multiplied by a calculation coefficient α may be used as a harmonic component Ih. The calculation coefficient α may be greater than zero and equal to or less than one. The harmonic map can be produced by recording the calculated harmonic component Ih for each effective value Vrms.

Figure 8:
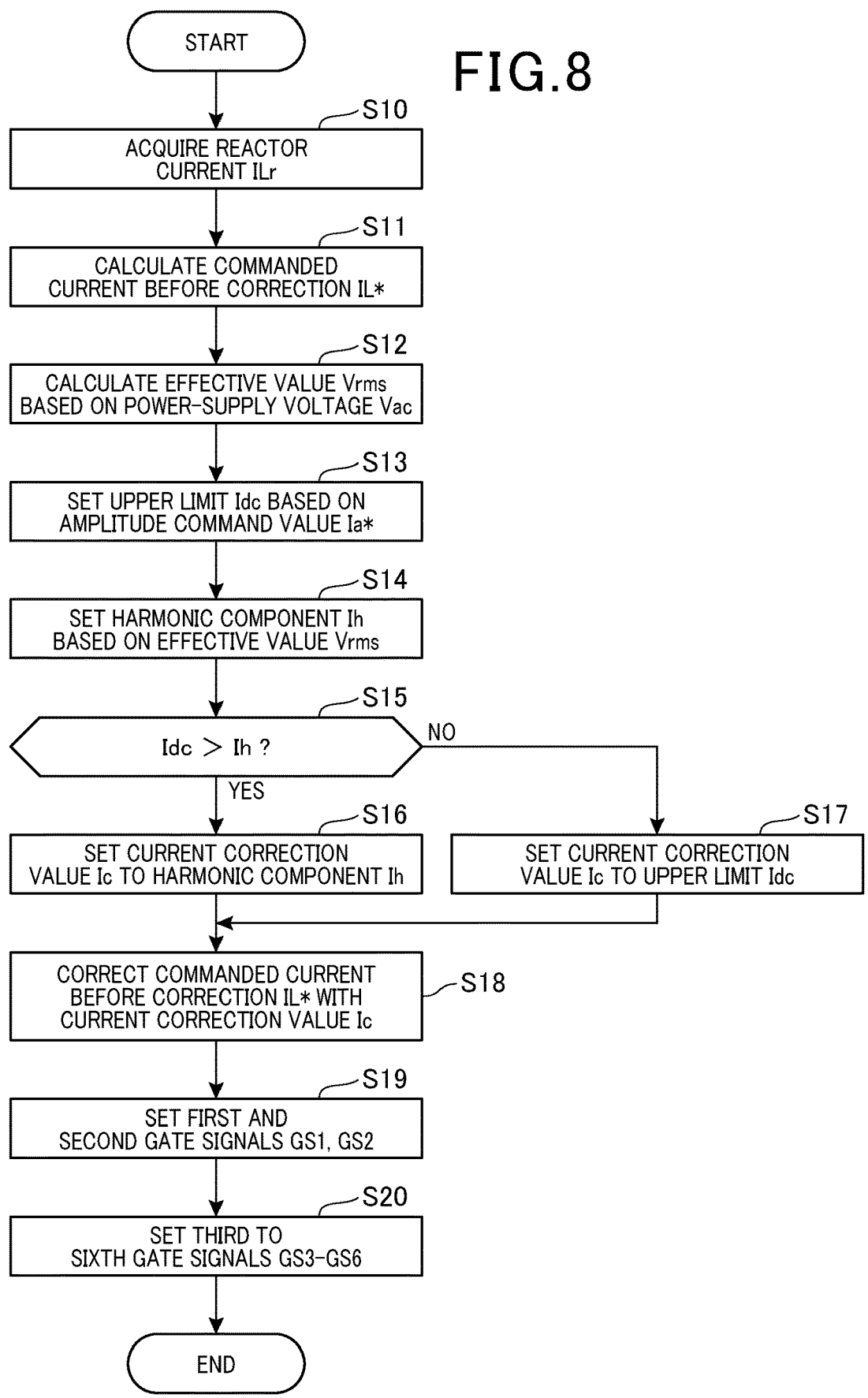
FIG. 8 is a flowchart of processing performed by the DC-AC converter.

In the present embodiment, controlling the DC-AC converter 10 will now be described with reference to FIG. 8. Processing shown in FIG. 8 is performed by the controller 30 every predetermined time interval.

At step S10, the DC-AC converter 10 acquires a reactor current ILr. A current acquirer is responsible for execution of step S10. At step S11, the DC-AC converter 10 calculates a commanded current before correction IL* by multiplying the amplitude command value Ia* and the reference waveform of the supply voltage Vac (|sin ωt|). At step S12, based on the supply voltage Vac, the DC-AC converter 10 calculates an effective value Vrms of the AC power source 200. The effective value calculator is responsible for execution of step S12.

At step S13, the DC-AC converter 10 sets an upper limit Idc based on the amplitude command value Ia*.

At step S14, based on the effective value Vrms calculated at step S12, the DC-AC converter 10 sets a harmonic component Ih. More specifically, with reference to the harmonic map corresponding to the effective value Vrms calculated at step S12, the DC-AC converter 10 sets a harmonic component Ih corresponding to the present time t1 within one period T of the supply voltage Vac.

At step S15, the DC-AC converter 10 compares the upper limit Idc set at step S13 and the harmonic component Ih set at step S14. If it is determined that the harmonic component Ih is less than the upper limit Idc, then the process flow proceeds to step S16. At step S16, the DC-AC converter 10 sets the current correction value Ic to the harmonic component Ih. If it is determined that the harmonic component Ih is equal to or higher than the upper limit Idc, then the process flow proceeds to step S17. At step S17, the DC-AC converter 10 sets the current correction value Ic to the upper limit Idc.

At step S18, the DC-AC converter 10 corrects the commanded current before correction IL* with the current correction value Ic set at step S16 or S17 to set the commanded current after correction ILa*.

At step S19, the DC-AC converter 10 performs peak current mode control using the commanded current after correction ILa* set at step S18. The peak current mode control performed at step S19 allows the first and second gate signals GS1, GS2 to be set so as to eliminate distortions in the output current Iac.

At step S20, the DC-AC converter 10 sets the third to sixth gate signals GS3-GS6. Thereafter, the process flow of the processing shown in FIG. 8 ends.

Figure 9:
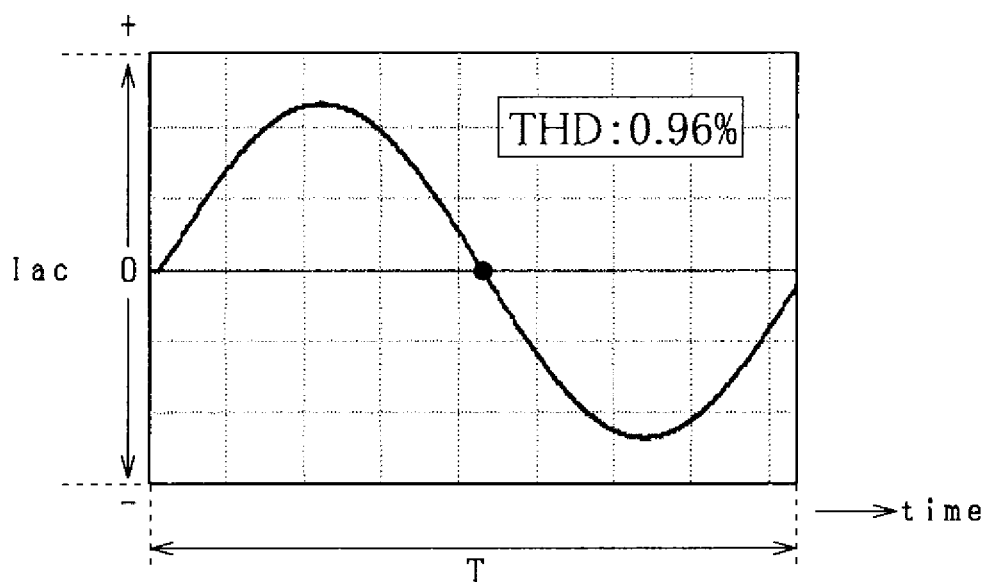
FIG. 9 is an example of a change in an output current acquired by correcting commanded current before correction using current correction values.
Figure 10:
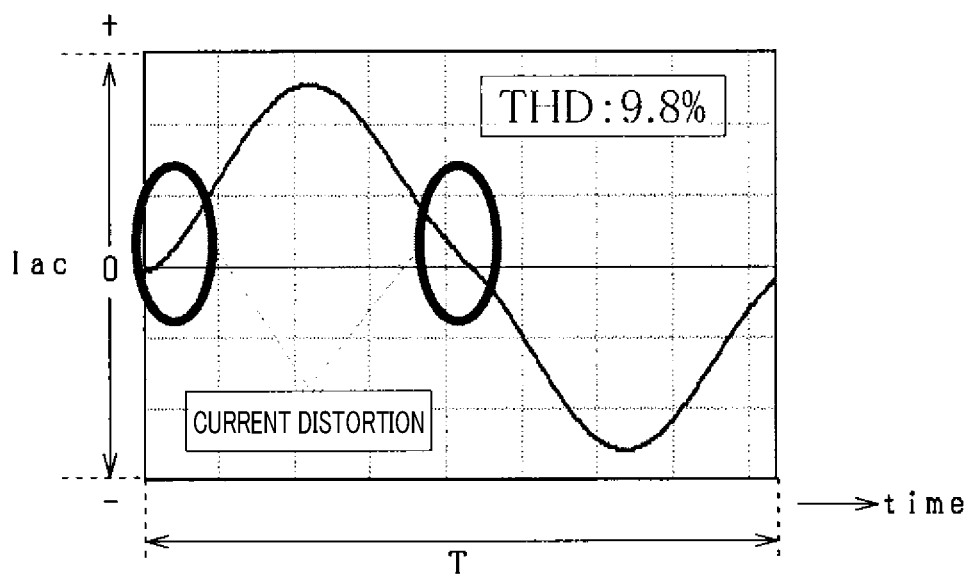
FIG. 10 is a comparative example of a change in an output current where commanded current before correction is not corrected.

FIG. 9 illustrates an example of output current Iac acquired by correcting the commanded current before correction IL* using the current correction value Ic of the present embodiment. FIG. 10 illustrates a comparative example of output current Iac where the commanded current before correction IL* is not corrected.

In FIG. 10, there are distortions in the output current Iac near zero crossings where the supply voltage Vac is zero. For example, in the case where the commanded current before correction IL* is not corrected, the total distortion rate THD in the output current Iac is 9.8%. Correcting the commanded current before correction IL* using the current correction value Ic in the above described manner can reduce distortions in the output current Iac near the zero crossings as shown in FIG. 9. For example, in the case where the commanded current before correction IL* is corrected using the current correction value Ic, the total distortion rate THD in the output current Iac is 0.96%.

The first embodiment of the present disclosure can provide the following advantages.

(A1) The controller 30 is configured to set the current correction value Ic including the harmonic component Ih for the frequency component of the supply voltage Vac that has minima at zero crossings. The controller 30 is further configured to add the current correction value Ic to the commanded current before correction IL*, thereby correcting the commanded current to the commanded current after correction ILa*. In the DC-AC converter 10, the commanded current after correction ILa* near zero crossings where the discrepancy Δi is minimal is set to a value responsive to the discrepancy Δi. This configuration can reduce only distortions in the output current Iac, which can prevent a reduction in power factor for output power of the DC-AC converter 10.

(A2) The controller 30 is configured to the harmonic component Ih to have a maximum during a period in time from one zero crossing of the supply voltage Vac to the next zero crossing. With such a configuration, the current correction value Ic can be set to change in response to the change in the commanded current after correction ILa*, thereby suppressing variations in the discrepancy Δi. This can further suppress current distortions in the output current Iac.

(A3) The controller 30 is configured to, if the harmonic component Ih is less than the upper limit Idc, set the current correction value Ic to the harmonic component Ih, and if the harmonic component Ih is equal to or greater than the upper limit Idc, set the current correction value Ic to the upper limit Idc. This configuration can prevent occurrence of a situation where the output current Iac flows excessively due to the current correction value Ic becoming unnecessarily large, which results in increased distortions in the output current Iac.

(A4) The controller 30 is configured to set the upper limit Idc based on the amplitude command value Ia*. This configuration can prevent excessive current flowing through the reactor 13.

(A5) The controller 30 is configured to calculate an effective value Vrms of the AC power source 200, and based on the calculated effective value Vrms of the AC power source 200, change the current correction value Ic. This configuration allows the power converter 100 to be used in various regions having different effective values Vrms.

Modifications to the First Embodiment (M1) In a modification to the first embodiment, the current sensor 32 for detecting the reactor current ILr may be connected between the source of the first switch Q1 and the first connection point K1 between the first switch Q1 and the second switch Q2. In such an embodiment, the controller 30 acquires a current through the first switch Q1 as a reactor current ILr.

(M2) In another modification to the first embodiment, the second switch Q2 may be normally in the open state, instead of performing synchronous rectification. In such an embodiment, the second gate signal GS2 may normally be placed in the LOW state.

Second Embodiment

A second embodiment will now be described. Only differences of the second embodiment from the first embodiment will be described and description about the common configuration between the first and second embodiments is not provided in order to avoid repetition. Identical or equivalent components or components of equal or equivalent action are identified by the same or similar reference numerals.

For example, the supply voltage Vac having a small amplitude may lead to a discontinuous mode having an intermittent reactor current ILr through the reactor 13. In the discontinuous mode, the amplitude command value Ia* has a smaller value as compared with a continuous mode. In a case where the amplitude command value Ia* has a small value, the current correction value Ic set by the current corrector 40 having an unnecessarily large value may cause an unnecessarily large output current Iac through the AC power source 200. In the present embodiment, unlike the first embodiment, the current corrector 40 is configured to change the current correction value Ic based on the amplitude command value Ia*.

Figure 11:
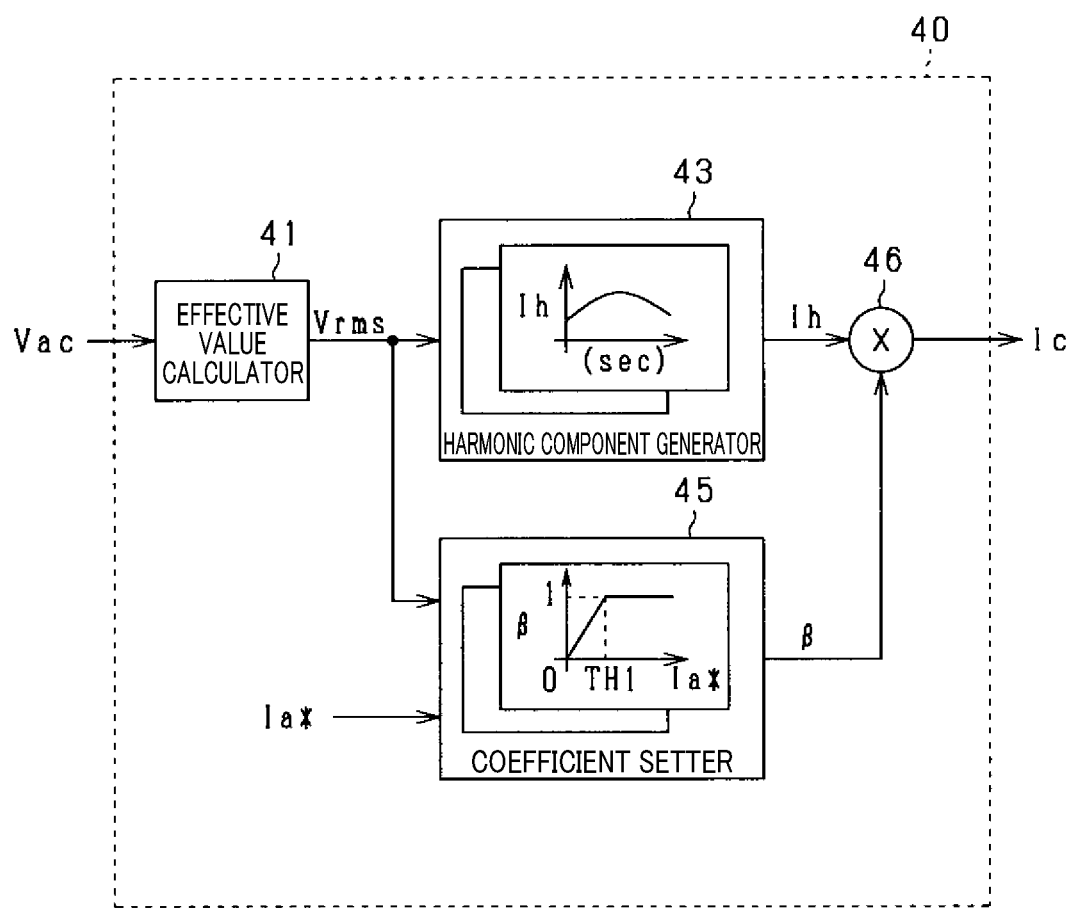
FIG. 11 is a functional block diagram of a current corrector in accordance with a second embodiment.

FIG. 11 is a functional block diagram of the current corrector 40 in accordance with the second embodiment. The current corrector 40 includes the effective value calculator 41, the harmonic component generator 43, a coefficient setter 45, and a multiplier 46.

The coefficient setter 45 is configured to, based on the amplitude command value Ia*, calculate a correction coefficient $\beta$ by which the harmonic component Ih is multiplied. In the present embodiment, the correction coefficient $\beta$ is set to a value greater than zero and equal to or less than one. The coefficient setter 45 is configured to, if the amplitude command value Ia* is less than a threshold TH1, set the correction coefficient $\beta$ to an increased value with increasing amplitude command value Ia*. The coefficient setter 45 is configured to, if the amplitude command value Ia* is equal to or greater than the threshold TH1, set the correction coefficient $\beta$ to one.

The multiplier 46 is configured to set the current correction value Ic to the harmonic component Ih set by the harmonic component generator 43 multiplied by the correction coefficient $\beta$ set by the coefficient setter 45. For the amplitude command value Ia* less than the threshold TH1, the current correction value Ic is set to an increased value with increasing amplitude command value Ia*. Conversely, the current correction value Ic is set to a decreasing value with decreasing amplitude command value Ia*.

Figure 12:
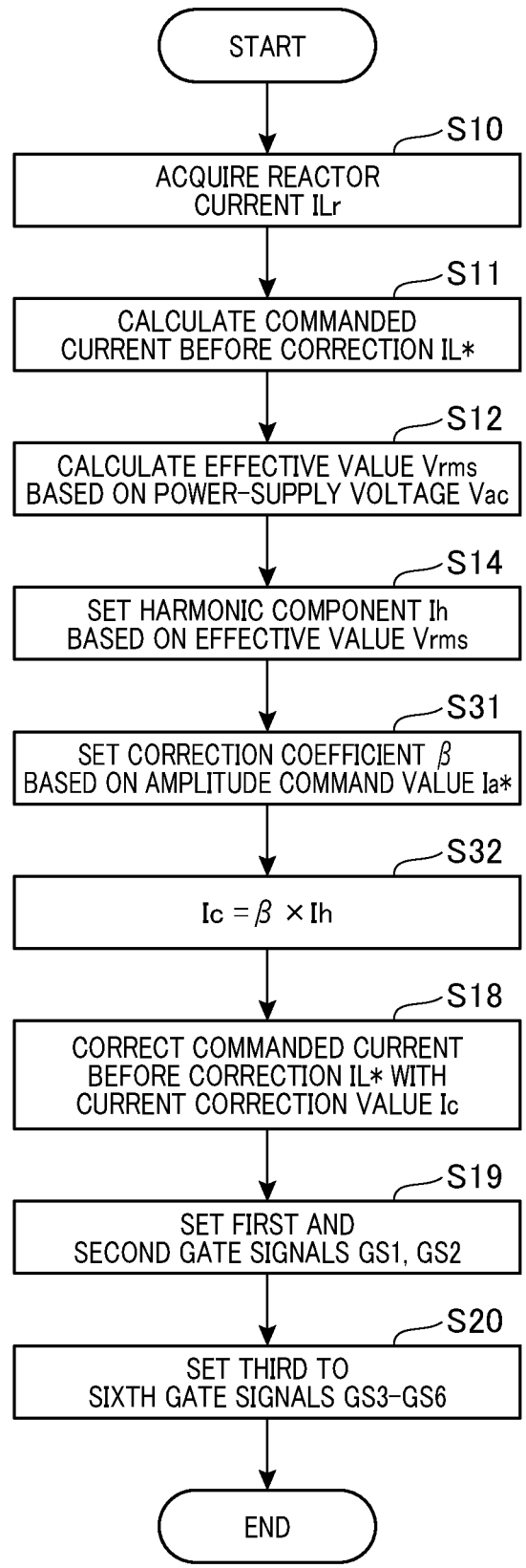
FIG. 12 is a flowchart of processing performed by the DC-AC converter according to the second embodiment.

In the present embodiment, controlling the DC-AC converter 10 will now be described with reference to FIG. 12. Processing shown in FIG. 12 is performed by the controller 30 every predetermined time interval.

After the DC-AC converter 10 setting the harmonic component Ih at step S14 based on the effective value Vrms calculated at step S12, the process flow proceeds to step S31. At step S31, based on the amplitude command value Ia*, the DC-AC converter 10 sets a correction coefficient $\beta$.

At step S32, the DC-AC converter 10 sets the current correction value Ic to the harmonic component Ih multiplied by the correction coefficient 3. At step S18, the DC-AC converter 10 corrects the commanded current before correction IL* using the current correction value Ic set at step S32.

The second embodiment of the present disclosure can provide the following advantages.

The controller 30 is configured to set the correction coefficient $\beta$ based on the amplitude command value Ia* and multiplies the harmonic component Ih by the correction coefficient $\beta$, thereby changing the harmonic component Ih. For a small amplitude command value Ia*, the current correction value Ic can be changed continuously as a function of the amplitude command value Ia*, which can prevent the output current Iac having an unnecessarily large value flowing through the AC power source 200.

Third Embodiment

A third embodiment will now be described. Only differences of the third embodiment from the first embodiment will be described and description about the common configuration between the first and third embodiments is not provided in order to avoid repetition. Identical or equivalent components or components of equal or equivalent action are identified by the same or similar reference numerals.

For example, in a case where a DC power source that is capable of changing its output voltage value is connected between the first and second input terminals IN1, IN2 of the DC-AC converter 10, the input voltage Vdc may change. For example, when the input voltage Vdc is lowered, the reactor current ILr changes in response to changes in voltage applied to the reactor 13, which may lead to a change in discrepancy $\Delta i$ that is a difference between the average Iave of the reactor current ILr and the commanded current before correction IL*. In the present embodiment, unlike the first embodiment, the controller 30 is configured to change the current correction value Ic in response to the input voltage Vdc.

Figure 13:
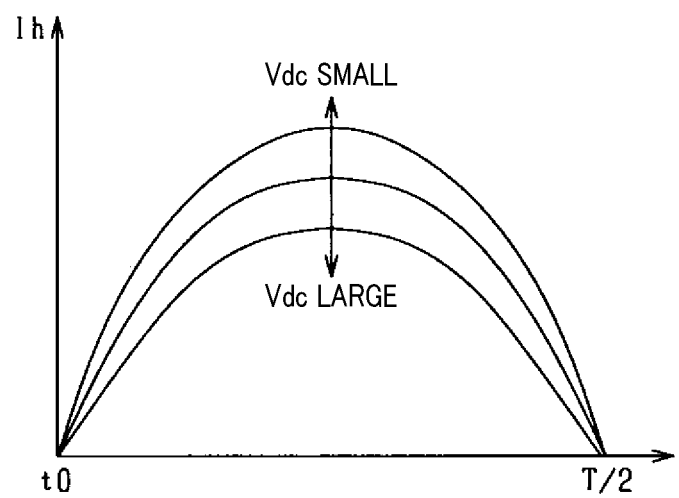
FIG. 13 is an example of harmonic maps stored in a harmonic generator according to a third embodiment.

The harmonic component generator 43 is configured to set the harmonic component Ih based on the effective value Vrms and the input voltage Vdc. Also in the present embodiment, the harmonic component Ih is a sinusoidal wave that has minima at or near zero crossings of the supply voltage Vac and maxima at peaks. As shown in FIG. 13 illustrating harmonic maps corresponding to a certain effective value Vrms, the discrepancy Δi increases with decreasing input voltage Vdc. Therefore, in the present embodiment, the harmonic component Ih is set with reference to the harmonic component maps corresponding to the respective effective values Vrms such that the amplitude of the harmonic component Ih at peaks increases with decreasing input voltage Vdc.

The third embodiment of the present disclosure can provide the following advantages.

The controller 30 is configured to change the harmonic component Ih in response to the input voltage Vdc supplied to the DC-AC converter 10. This configuration, even if the discrepancy Δi changes with a change in the input voltage Vdc, can pass the output current Iac responsive to the discrepancy Δi after change through the AC power source 200. This can prevent an unnecessarily large output current Iac flowing through the AC power source 200 and an unnecessarily small output current Iac flowing through the AC power source 200.

Fourth Embodiment

A fourth embodiment will now be described. Only differences of the fourth embodiment from the first embodiment will be described and description about the common configuration between the first and fourth embodiments is not provided in order to avoid repetition. Identical or equivalent components or components of equal or equivalent action are identified by the same or similar reference numerals.

The present embodiment is different from the first embodiment in circuit topology of the DC-AC converter 10. More specifically, unlike the first embodiment, the DC-AC converter 10 of the present embodiment includes no half-bridge circuit.

Figure 14:
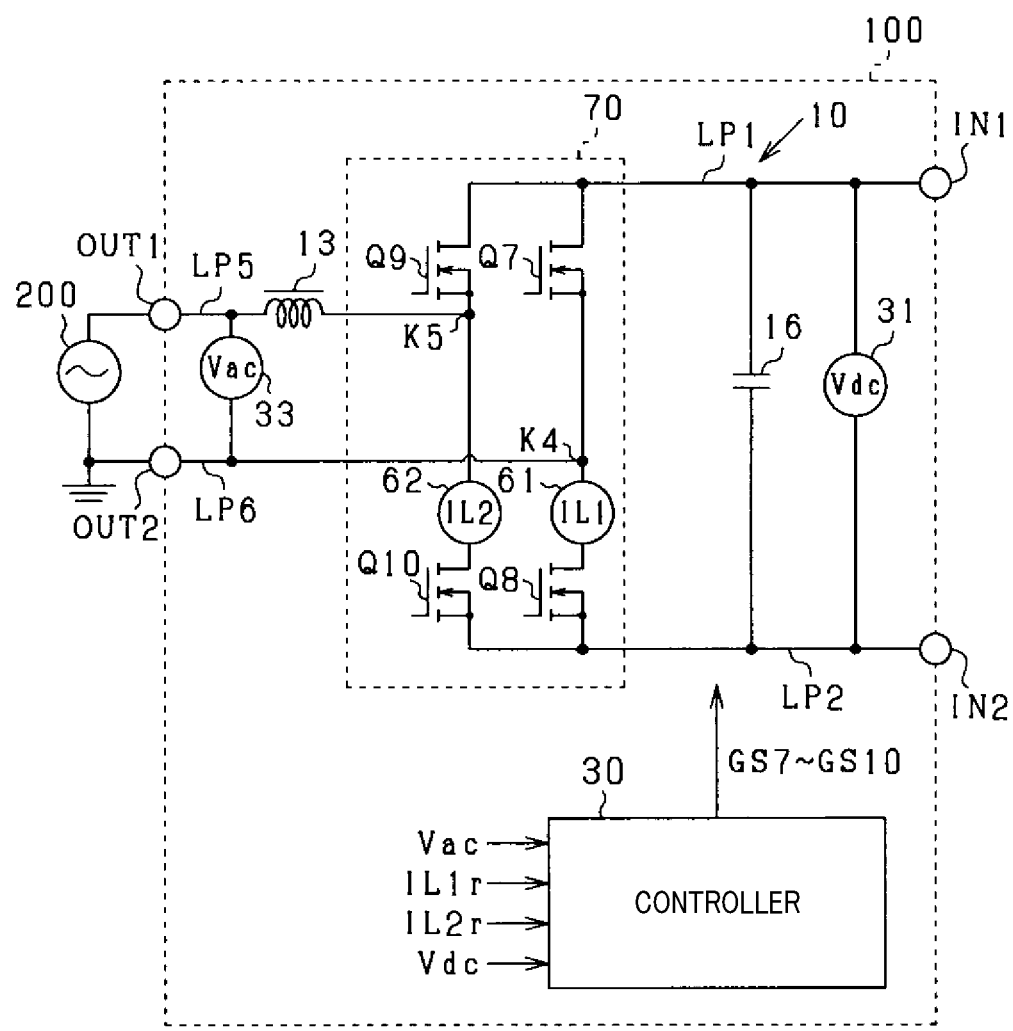
FIG. 14 is a circuit diagram of a power converter according to a fourth embodiment.

FIG. 14 illustrates a circuit diagram of the power converter 100 in accordance with the present embodiment. The first input terminal IN1 is connected to a full-bridge circuit 70 through the first wiring LP1. The second input terminal IN2 is connected to the full-bridge circuit 70 through the second wiring LP2.

The full-bridge circuit 70 includes seventh to tenth switches Q7-Q10. The seventh to tenth switches Q7-Q10 are voltage-driven switches, which are N-channel MOSFETs in the present embodiment. A source of the seventh switch Q7 and a drain of the eighth switch Q8 are connected to each other. A source of the ninth switch Q9 and a drain of the tenth switch Q10 are connected to each other. Drains of the seventh and ninth switches Q7, Q9 are connected to the first wiring LP1. Sources of the eighth and tenth switch Q8, Q10 are connected to the second wiring LP2. Each of the seventh to tenth switches Q7-Q10 has a parasitic diode connected in anti-parallel therewith.

A fourth connection point K4 between the seventh switch Q7 and the eighth switch Q8 is connected to a first end of the sixth wiring LP6. A second end of the sixth wiring LP6 is connected to the second output terminal OUT2. A fifth connection point K5 between the ninth switch Q9 and the tenth switch Q10 is connected to a first end of the fifth wiring LP5. A second end of the fifth wiring LP5 is connected to the first output terminal OUT1. The reactor 13 is provided along the fifth wiring LP5.

A first current sensor 61 for detecting a first reactor current IL1r is connected between the source of the seventh switch Q7 and the drain of the eighth switch Q8 and provided on the opposite side of the fourth connection point K4 from the seventh switch Q7. A second current sensor 62 for detecting a second reactor current IL2r is connected between the source of the ninth switch Q9 and the drain of the tenth switch Q10 and provided on the opposite side of the fifth connection point K5 from the ninth switch Q9.

Figure 15:
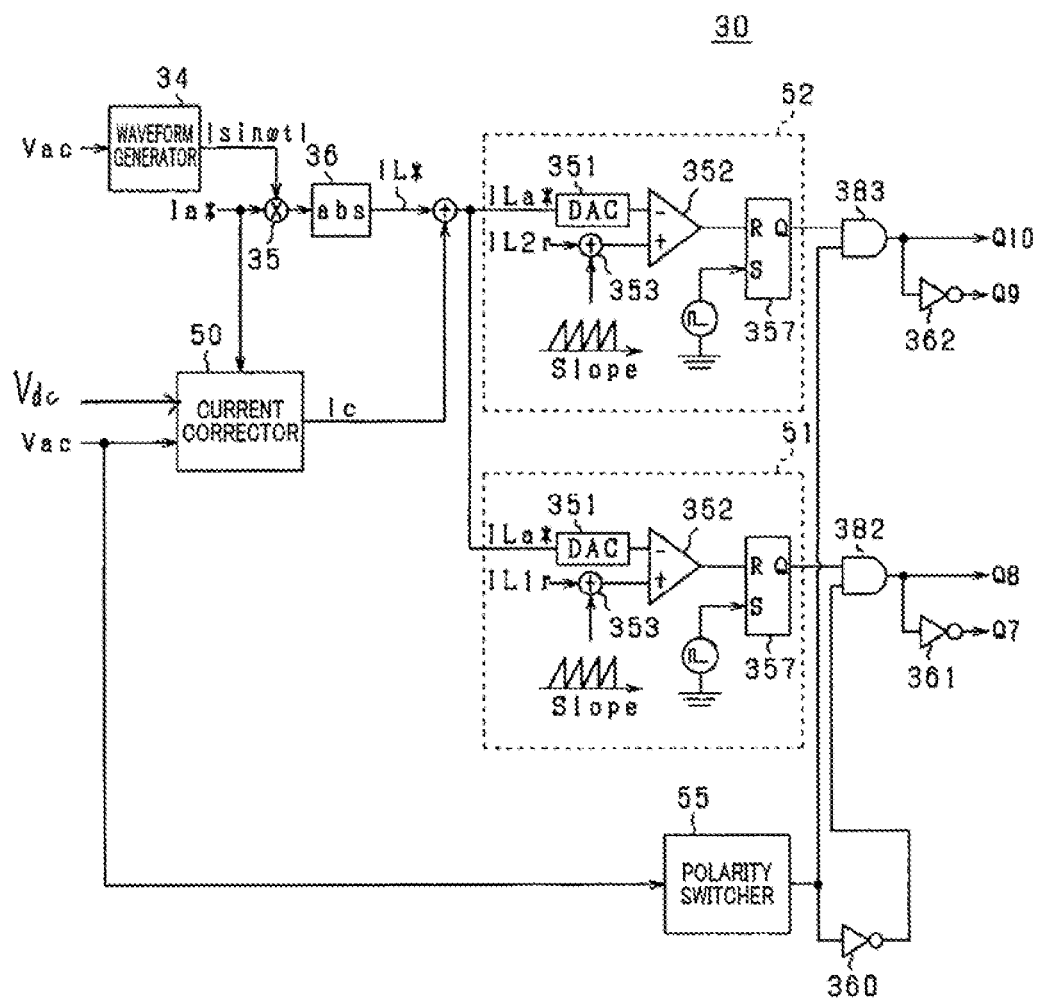
FIG. 15 is a functional block diagram of a controller according to the fourth embodiment.

FIG. 15 is a functional block diagram of the controller 30 of the fourth embodiment. Also in the present embodiment, the controller 30 controls the DC-AC converter 10 using peak current mode control.

The controller 30 includes a first current controller 51 and a second current controller 52. The first current controller 51 is configured to perform peak current mode control to control the first reactor current IL1r to the commanded current after correction ILa*. The second current controller 52 is configured to performs peak current mode control to control the second reactor current IL2r to the commanded current after correction ILa*. Each of the first and second current controllers 51, 52 is similar in configuration to the current controller 50 of the first embodiment and thus will not be redundantly described.

The output of the first current controller 51 is connected to one of input terminals of the first AND circuit 382 and the output of the second current controller 52 is connected to one of input terminals of the second AND circuit 383. The output terminal of the polarity switcher 55 is connected to the other one of the input terminals of the second AND circuit 383 and the input terminal of an inverter 360. The output terminal of the inverter 360 is connected to the other one of the input terminals of the first AND circuit 382.

An output signal of the RS flip-flop 357 of the first current controller 51 and an output signal of the polarity switcher 55 are input to the first AND circuit 382. The output terminal of the first AND circuit 382 is connected to the gate of the eighth switch Q8. A signal output from the first AND circuit 382 to the gate of the eighth switch Q8 is an eighth gate signal GS8 for effecting opening and closing of the eighth switch Q8. The output terminal of the first AND circuit 382 is connected to the gate of the seventh switch Q7 through the inverter 361. A signal output from the first AND circuit 382 via the inverter 361 to the gate of the seventh switch Q7 is a seventh gate signal GS7 for effecting opening and closing of the seventh switch Q7. The seventh gate signal GS7 is the inverse of the eighth gate signal GS8.

An output signal of the RS flip-flop 357 of the second current controller 52 and an output signal of the polarity switcher 55 are input to the second AND circuit 383. The output terminal of the second AND circuit 383 is connected to the gate of the tenth switch Q10. A signal output from second AND circuit 383 to the gate of the tenth switch Q10 is a tenth gate signal GS10 for effecting opening and closing of the tenth switch Q10. The output terminal of the second AND circuit 383 is connected to the gate of the ninth switch Q9 through the inverter 362. A signal output from the second AND circuit 383 via the inverter 362 to the gate of the ninth switch Q9 is a ninth switch Q9 for effecting opening and closing of the ninth gate signal GS9. The ninth gate signal GS9 is the inverse of the tenth gate signal GS10.

When a HIGH output signal of the polarity switcher 55 and a HIGH output signal of the RS flip-flop 357 are input to the first AND circuit 382, the first AND circuit 382 outputs a HIGH eighth gate signal GS8 and a LOW seventh gate signal GS7. When a HIGH output signal of the polarity switcher 55 and a HIGH output signal of the RS flip-flop 357 are input to the second AND circuit 383, the second AND circuit 383 outputs a HIGH tenth gate signal GS10 and a LOW ninth gate signal GS9.

Figure 16:
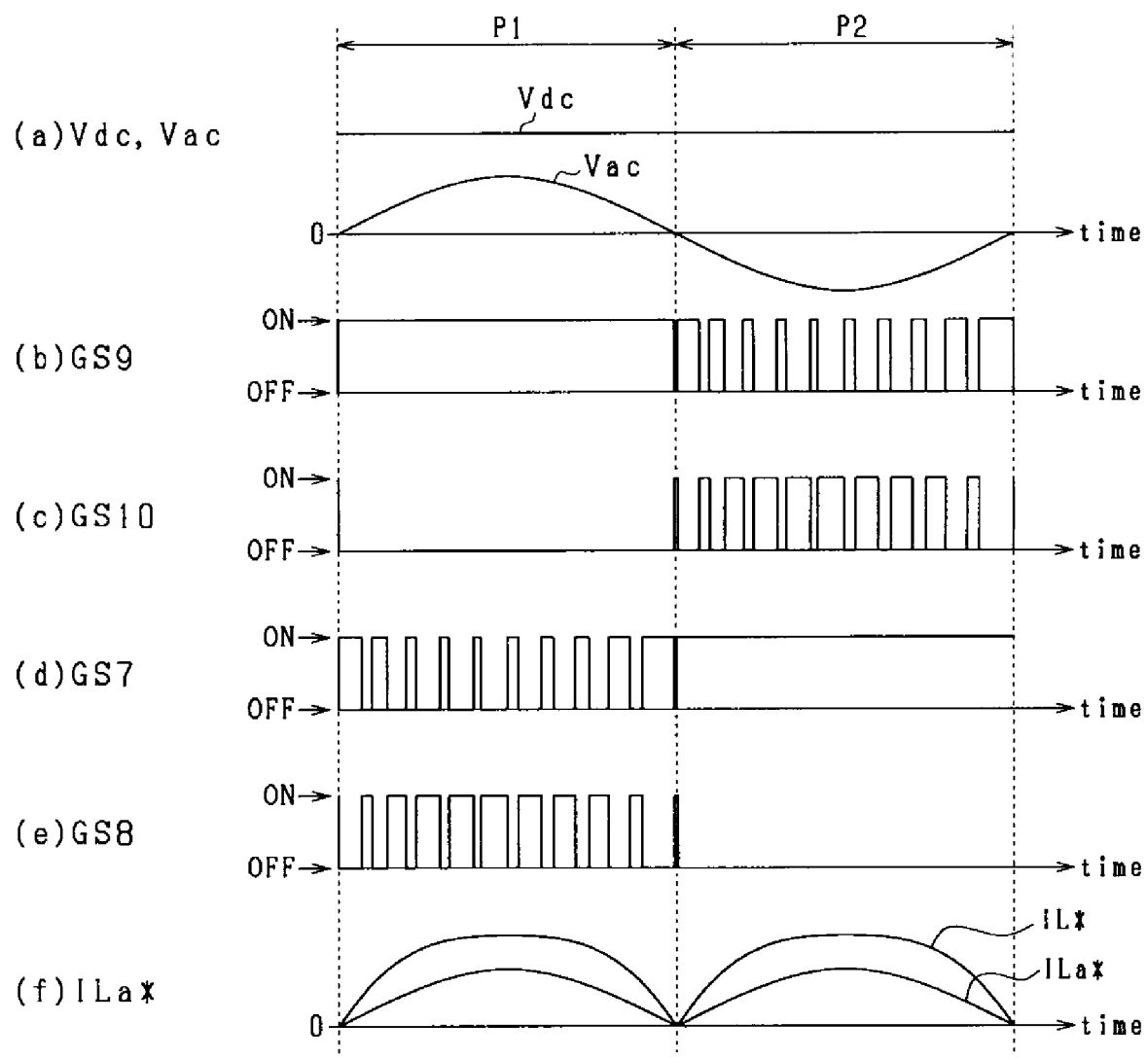
FIG. 16 is a timing diagram for a DC-AC converter according to the fourth embodiment.

FIG. 16 is a timing diagram for the DC-AC converter 10 of the fourth embodiment. FIG. 16(a) illustrates an example of a change in each of the input voltage Vdc and the supply voltage Vac. FIG. 16(b) illustrates an example of a change in the ninth gate signal GS9. FIG. 16(c) illustrates an example of a change in the tenth gate signal GS10. FIG. 16(d) illustrates an example of a change in the seventh gate signal GS7. FIG. 16(e) illustrates an example of a change in the eighth gate signal GS8. FIG. 16(f) illustrates an example of a change in the commanded current after correction ILa*.

During the first period P1 where the supply voltage Vac is positive, the HIGH ninth gate signal GS9 places the ninth switch Q9 in the closed state and the LOW tenth gate signal GS10 places the tenth switch Q10 in the open state. During the first period P1, the first current controller 51, using peak current mode control, changes each of the seventh and eighth gate signals GS7, GS8 from the HIGH state to the LOW state or from the LOW state to the HIGH state to control the first reactor current IL1r to the commanded current after correction ILa*. Placing the eighth switch Q8 in the closed state and the seventh switch Q7 in the open state forms a closed circuit including the eighth and ninth switches Q8, Q9, and the reactor 13, resulting in the output current Iac flowing from the first output terminal OUT1 to the second output terminal OUT2.

During the second period P2 where the supply voltage Vac is negative, the HIGH seventh gate signal GS7 places the seventh switch Q7 in the closed state and the LOW eighth gate signal GS8 places the eighth switch Q8 in the open state. During the second period P2, the second current controller 52, using peak current mode control, changes each of the ninth and tenth gate signals GS9, GS10 from the HIGH state to the LOW state or from the LOW state to the HIGH state to control the second reactor current IL2r to the commanded current after correction Ila*. Placing the tenth switch Q10 in the closed state and the ninth switch Q9 in the open state forms a closed circuit including the seventh and tenth switches Q7, Q10, and the reactor 13, resulting in the output current Iac flowing from the second output terminal OUT2 to the first output terminal OUT1.

The fourth embodiment of the present disclosure can provide advantages similar to those of the first embodiment.

First Modification to the Fourth Embodiment

In a first modification to the fourth embodiment, the first current sensor 61 may be provided on the drain side of the seventh switch Q7 and the second current sensor 62 may be provided on the drain side of the ninth switch Q9.

Second Modification to the Fourth Embodiment

Figure 17:
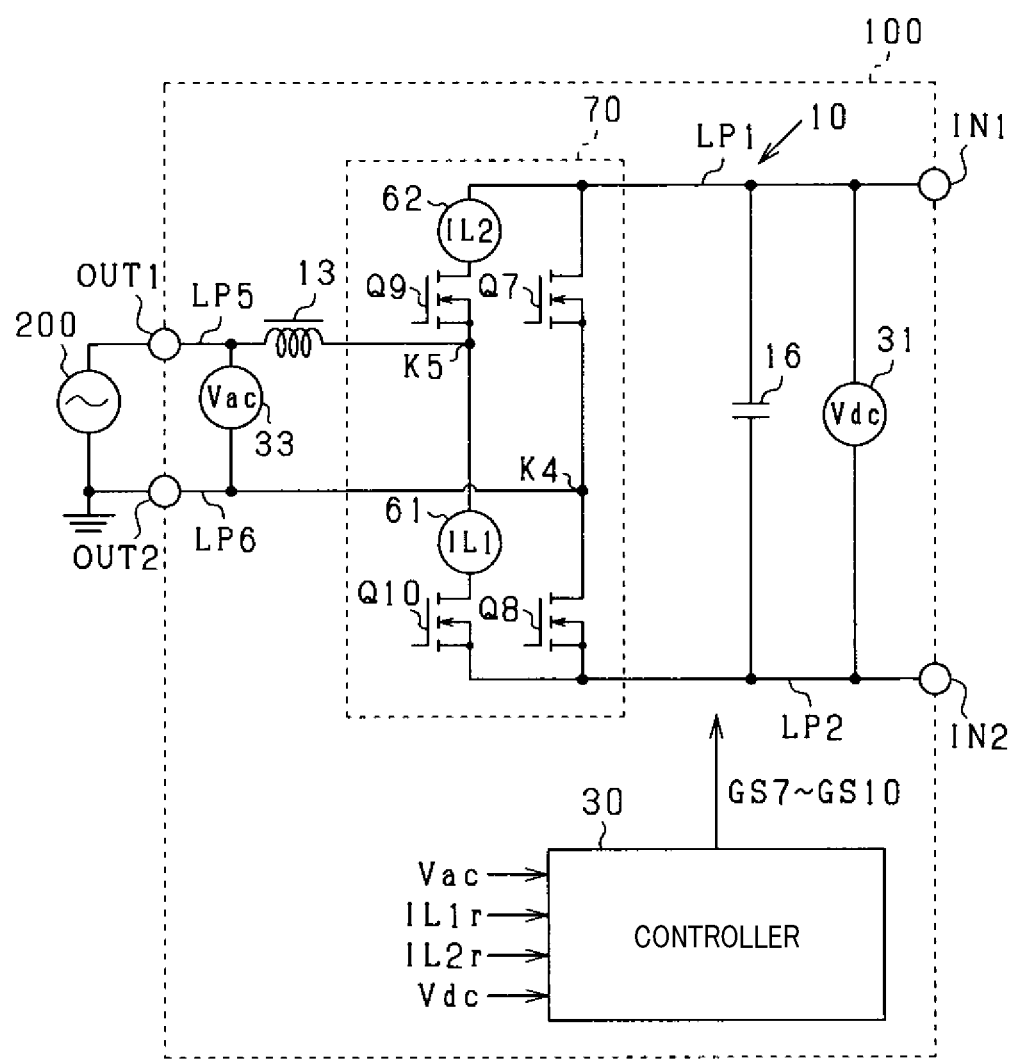
FIG. 17 is a circuit diagram of a power converter according to a modification to the fourth embodiment.

A second modification to the fourth embodiment will now be described. FIG. 17 illustrates a circuit diagram of the power converter 100 in accordance with the second modification to the fourth embodiment. In the present modification, the first current sensor 61 may be connected between the source of the ninth switch Q9 and the drain of the tenth switch Q10 and provided on the opposite side of the fifth connection point K5 from the ninth switch Q9. The second current sensor 62 may be provided on the drain side of the ninth switch Q9.

Figure 18:
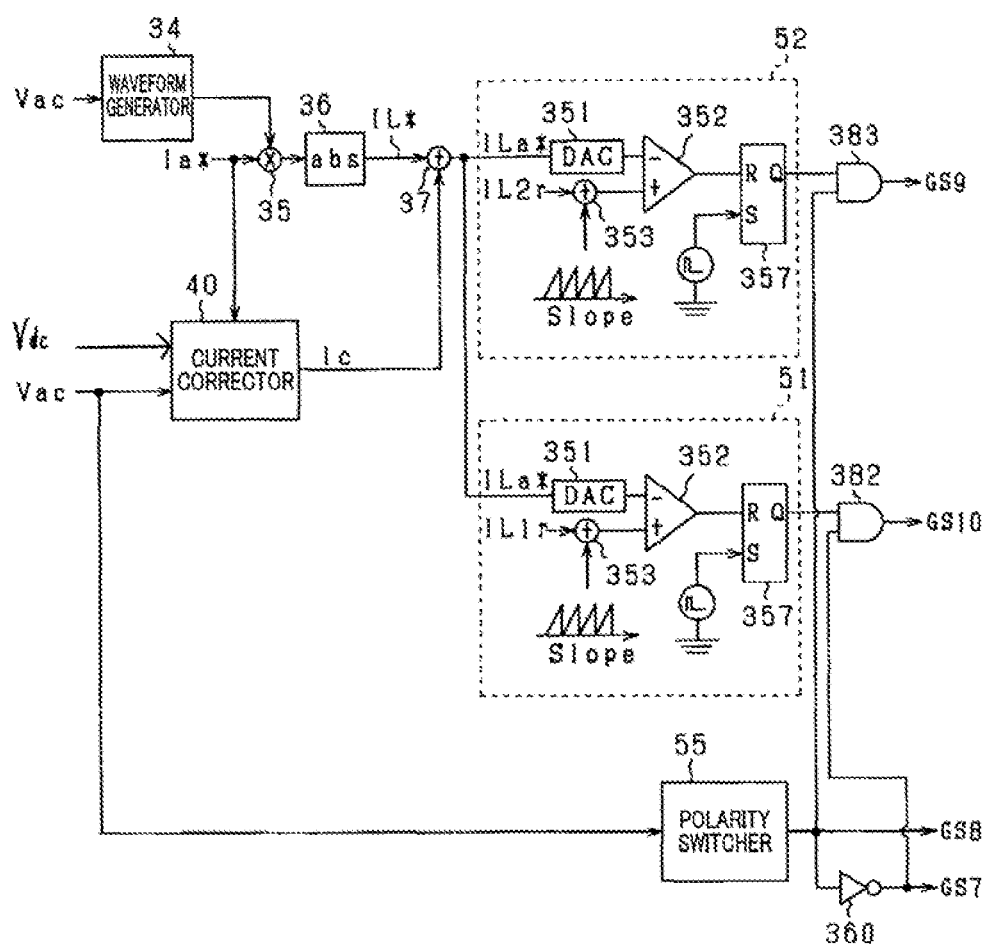
FIG. 18 is a functional block diagram of a controller according to the modification to the fourth embodiment.

FIG. 18 is a functional block diagram of the controller 30 of the second modification to the fourth embodiment. Also in the present modification, the controller 30 controls the DC-AC converter 10 using peak current mode control.

The output terminal of the polarity switcher 55 is connected to the input terminal of the second AND circuit 383 and the gate of the eighth switch Q8, and the input terminal of the inverter 360. The output terminal of the inverter 360 is connected to the input terminal of the first AND circuit 382 and the gate of the seventh switch Q7.

The output signal of the RS flip-flop 357 of the first current controller 51 and the inverse of the output signal of the polarity switcher 55 are input to the first AND circuit 382. The output terminal of the first AND circuit 382 is connected to the gate of the tenth switch Q10.

The output signal of the RS flip-flop 357 of the second current controller 52 and the output signal of the polarity switcher 55 are input to the second AND circuit 383. The output terminal of the second AND circuit 383 is connected to the gate of the ninth switch Q9.

A signal output from the first AND circuit 382 to the gate of the tenth switch Q10 is a tenth gate signal GS10. A signal output from the second AND circuit 383 to the gate of the ninth switch Q9 is a ninth gate signal GS9. A signal output from the polarity switcher 55 via the inverter 360 to the gate of the seventh switch Q7 is a seventh gate signal GS7. A signal output from the polarity switcher 55 to the gate of the eighth switch Q8 is an eighth gate signal GS8.

During the first period P1 where the supply voltage Vac is positive, the HIGH output signal of the polarity switcher 55 leads to the HIGH eighth gate signal GS8 and the LOW seventh gate signal GS7. During the first period P1, the second current controller 52, using peak current mode control, changes the ninth gate signal GS9 from the HIGH state to the LOW state or from the LOW state to the HIGH state to control the second reactor current IL2r to the commanded current after correction ILa*.

During the second period P2 where the supply voltage Vac is negative, the LOW output signal of the polarity switcher 55 leads to the LOW eighth gate signal GS8 and the HIGH seventh gate signal GS7. During the second period P2, the first current controller 51, using peak current mode control, changes the tenth gate signal GS10 from the HIGH state to the LOW state or from the LOW state to the HIGH state to control the first reactor current IL1r to the commanded current after correction ILa*.

Also in the present modification, the current corrector 40 is configured to superimpose the current correction value Ic on the commanded current before correction IL* to calculate the commanded current after correction ILa*, thereby reducing distortions in the output current Iac.

Third Modification to the Fourth Embodiment

In a fourth modification to the fourth embodiment, the seventh switch Q7 may be normally in the open state during the first period P1 and the ninth switch Q9 may be normally in the open state during the second period P2. In such a modification, in the timing diagram of FIG. 16, the seventh gate signal GS7 may be kept in the LOW state during the first period P1 and the ninth gate signal GS9 may be kept in the LOW state during the second period P2.

Fifth Embodiment

A fifth embodiment will now be described. Only differences of the fifth embodiment from the fourth embodiment will be described and description about the common configuration between the fifth and fourth embodiments is not provided in order to avoid repetition. Identical or equivalent components or components of equal or equivalent action are identified by the same or similar reference numerals.

Figure 19:
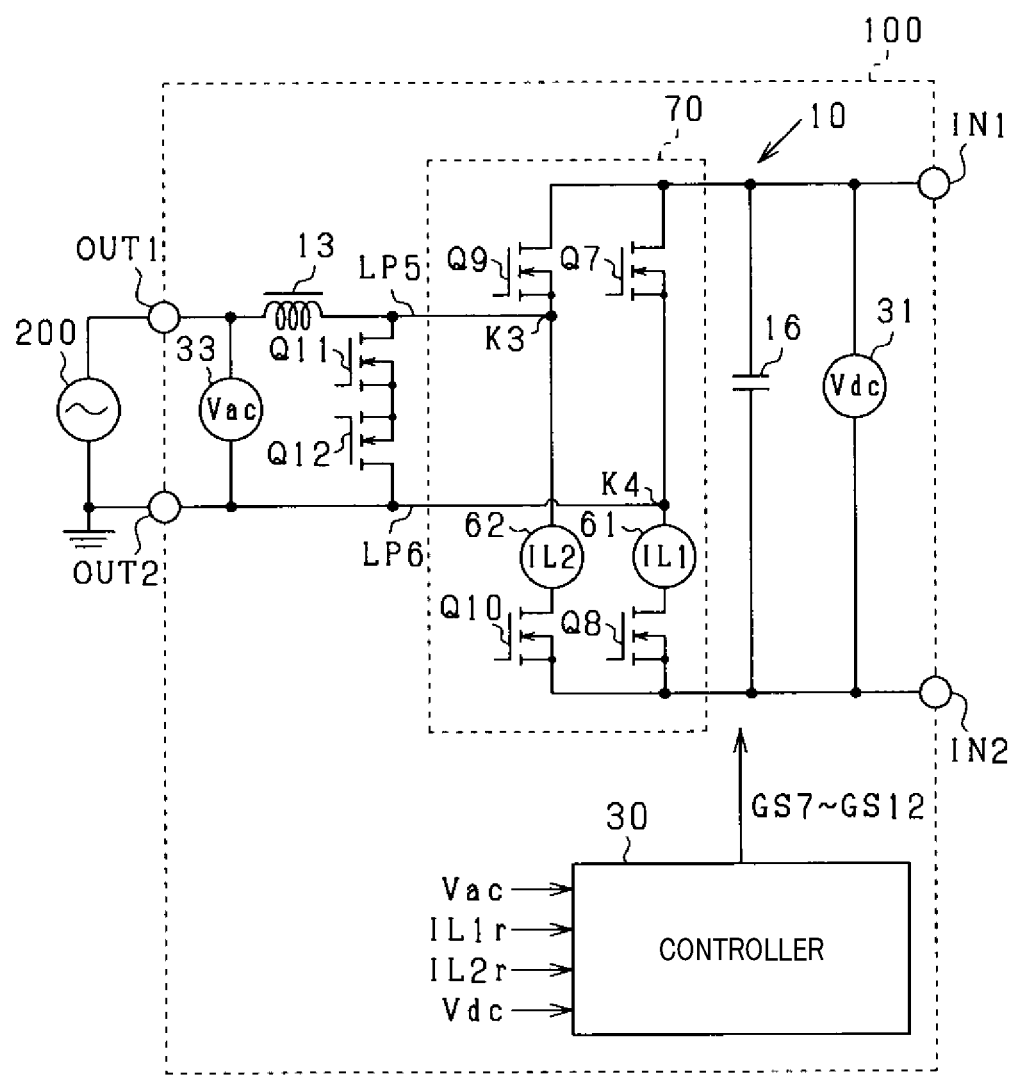
FIG. 19 is a circuit diagram of a power converter in accordance with a fifth embodiment.

FIG. 19 is a circuit diagram of the DC-AC converter 10 in accordance with the fifth embodiment. In the DC-AC converter 10 of the fifth embodiment, an eleventh switch Q11 and a twelfth switch Q12 are provided between the first and second output terminals OUT1, OUT2 and the full-bridge circuit 70. More specifically, a source of the eleventh switch Q11 and a source of the twelfth switch Q12 are connected to each other. A drain of the eleventh switch Q11 is connected to part of the fifth wiring LP5 between the reactor 13 and the full-bridge circuit 70. A drain of the twelfth switch Q12 is connected to the sixth wiring LP6.

Each of the eleventh and twelfth switches Q11, Q12 has a parasitic diode connected in anti-parallel therewith.

Figure 20:
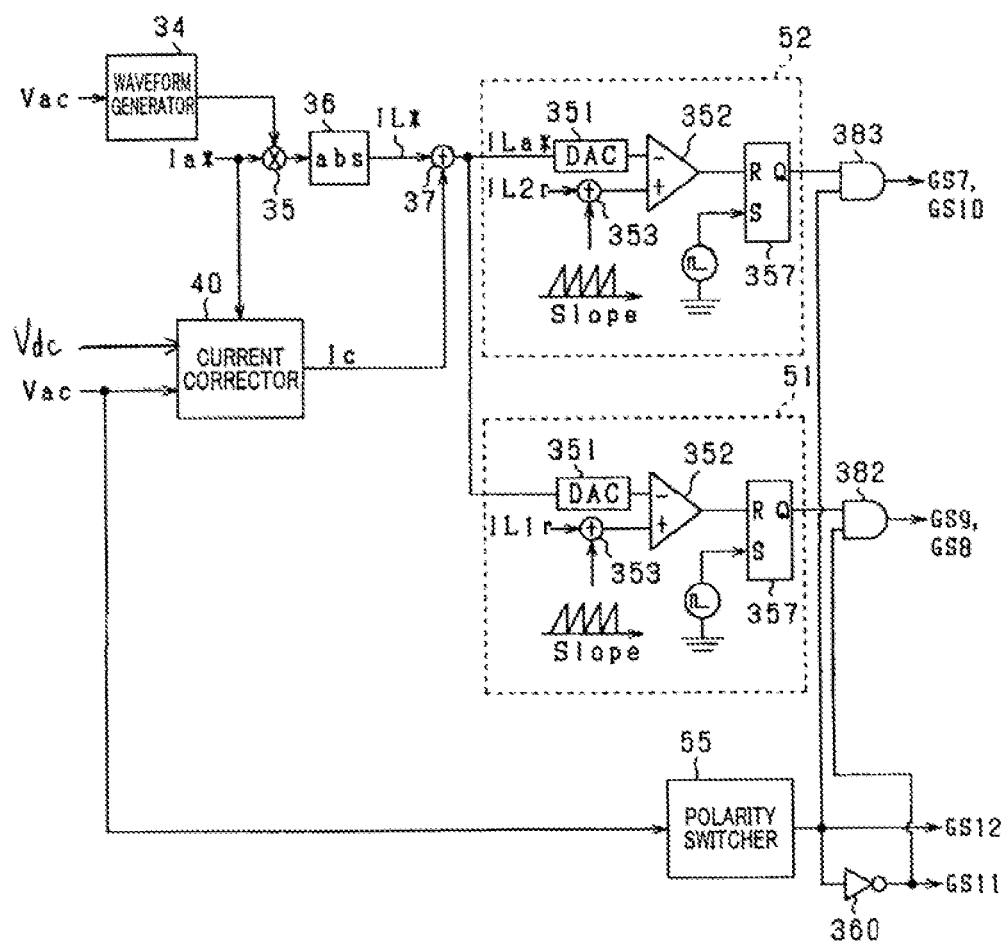
FIG. 20 is a functional block diagram of a controller according to a fifth embodiment.

FIG. 20 is a functional block diagram of the controller 30 of the fifth embodiment. Also in the present embodiment, the controller 30 controls the DC-AC converter 10 using peak current mode control.

The output terminal of the polarity switcher 55 is connected to the input terminal of the second AND circuit 383, the gate of the twelfth switch Q12, and the input terminal of the inverter 360. The output terminal of the inverter 360 is connected to the input terminal of the first AND circuit 382 and the gate of the eleventh switch Q11.

The output terminal of the first AND circuit 382 is connected to the gate of each of the eighth and ninth switches Q8, Q9. The output terminal of the second AND circuit 383 is connected to the gate of each of the seventh and tenth switches Q7, Q10.

A signal output from the first AND circuit 382 to the gate of the eighth switch Q8 is an eighth gate signal GS8. A signal output from the first AND circuit 382 to the gate of the ninth switch Q9 is a ninth gate signal GS9. A signal output from the second AND circuit 383 to the gate of the seventh switch Q7 is a seventh gate signal GS7. A signal output from the second AND circuit 383 to the gate of the tenth switch Q10 is a tenth gate signal GS10. A signal output from the polarity switcher 55 via the inverter 360 to the gate of the eleventh switch Q11 is an eleventh gate signal GS11. A signal output from the polarity switcher 55 to the gate of the twelfth switch Q12 is a twelfth gate signal GS12.

FIG. 21 is a timing diagram for the DC-AC converter 10 of the fifth embodiment. FIG. 21(a) illustrates an example of a change in each of the input voltage Vdc and the supply voltage Vac. FIG. 21(b) illustrates an example of a change in each of the eighth and ninth gate signals GS8, GS9. FIG. 21(c) illustrates an example of a change in each of the seventh and tenth gate signals GS7, GS10. FIG. 21(d) illustrates an example of a change in the eleventh gate signal GS11. FIG. 21(e) illustrates an example of a change in the twelfth gate signal GS12. FIG. 21(f) illustrates an example of a change in the commanded current after correction ILa*.

During the first period P1 where the supply voltage Vac is positive, the HIGH twelfth gate signal GS12 places the twelfth switch Q12 in the closed state and the LOW eleventh gate signal GS11 places the eleventh switch Q11 in the open state. During the first period P1, the first current controller 51, using peak current mode control, changes each of the eighth and ninth gate signals GS8, GS9 from the HIGH state to the LOW state or from the LOW state to the HIGH state to control the first reactor current IL1r to the commanded current after correction ILa*.

During the second period P2 where the supply voltage Vac is negative, the LOW twelfth gate signal GS12 places the twelfth switch Q12 in the open state and the HIGH eleventh gate signal GS11 places the eleventh switch Q11 in the closed state. During the second period P2, the second current controller 52, using peak current mode control, changes each of the seventh and tenth gate signals GS7, GS10 from the HIGH state to the LOW state or from the LOW state to the HIGH state to control the second reactor current IL2r to the commanded current after correction ILa*.

Also in the present embodiment, the current corrector 40 is configured to superimpose the current correction value Ic on the commanded current before correction IL* to calculate the commanded current after correction ILa*, thereby reducing distortions in the output current Iac.

The present embodiment of the present disclosure can provide advantages similar to those of the first embodiment.

Modification (M3) The full-bridge circuit 12 may be a circuit formed of four insulated gate bipolar transistors (IGBTs). The second switch Q2 may be formed of an IGBT or a diode.

What is claimed is:

1. An apparatus for controlling a DC-AC converter including a reactor and a plurality of drive switches and configured to convert direct-current (DC) power supplied via input terminals into alternating-current (AC) power and supply the alternating-current (AC) power to an AC power source connected to output terminals, the DC-AC converter being provided with a current detector configured to detect a reactor current through the reactor, the apparatus comprising:
   a current corrector configured to set a current correction value including a harmonic component for a frequency component of a supply voltage of the AC power source that has minima at zero crossings where the supply voltage of the AC power source is zero and superimpose the current correction value on a sinusoidal commanded current generated based on the supply voltage of the AC power source, thereby generating a commanded current after correction; and
   a current controller configured to operate the drive switches using peak current mode control to control the reactor current to the commanded current after correction.

2. The apparatus according to claim 1, wherein the current corrector is configured to set the harmonic component so as to have a maximum during a period in time from one zero crossing of the supply voltage Vac to the next zero crossing.

3. The apparatus according to claim 1, wherein the current corrector is configured to, if the harmonic component is less than an upper limit, set the current correction value to the harmonic component, and if the harmonic component is equal to or greater than the upper limit, set the current correction value to the upper limit.

4. The apparatus according to claim 3, wherein the current corrector is configured to set the upper limit based on the amplitude command value.

5. The apparatus according to claim 1, wherein the current corrector is configured to set a correction coefficient based on an amplitude of the sinusoidal commanded current and multiply the harmonic component by the correction coefficient to thereby change the harmonic component.

6. The apparatus according to claim 1, further comprising an effective value calculator configured to calculate an effective value of the AC power source,
   wherein the current corrector is configured to change the current correction value based on the effective value of the AC power source calculated by the effective value calculator.

7. The apparatus according to claim 1, wherein
the DC-AC converter is provided with a voltage detector configured to detect a voltage between the input terminals as an input voltage, and
the current corrector is configured to change the current correction value based on the input voltage detected by the voltage detector.

8. The apparatus according to claim 1, wherein
the peak current mode control includes setting a duty cycle D of on-period of the drive switches to control a sum of the reactor current and a slope compensation signal to the commanded current after correction,
the harmonic component is calculated based on a discrepancy indicating a difference between an average of the reactor current over one switching period and the commanded current, the discrepancy being calculated according to the following expression:

$$\Delta i = m \cdot \frac{\sqrt{2}\, V_{rms} \cdot |\sin\omega t|}{V_{dc}} \cdot T_{sw} + \frac{\sqrt{2}\, V_{rms} \cdot |\sin\omega t| \cdot (V_{dc} - \sqrt{2}\, V_{ac} \cdot |\sin\omega t|)}{2L \cdot V_{dc}} \cdot T_{sw}$$

where $\Delta i$ represents the discrepancy, m represents a rate of increase in the slope compensation signal, Vrms represents the effective value of the AC power source, $\omega t$ represents a phase angle of the AC power source, Tsw represents one switching period of the drive switches, L represents an inductance of the reactor, and Vdc represents an input voltage of the DC-AC converter.

* * * * *